United States Patent
Jeong et al.

(10) Patent No.: US 12,460,527 B2
(45) Date of Patent: Nov. 4, 2025

(54) PREDICTING FORMATION-TOP DEPTHS AND DRILLING PERFORMANCE OR DRILLING EVENTS AT A SUBJECT LOCATION

(71) Applicant: Schlumberger Technology Corporation, Sugar Land, TX (US)

(72) Inventors: Cheolkyun Jeong, Sugar Land, TX (US); Yingwei Yu, Katy, TX (US); Velizar Vesselinov, Sugar Land, TX (US); Richard John Meehan, Houston, TX (US); Priya Mishra, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 493 days.

(21) Appl. No.: 18/000,544

(22) PCT Filed: May 27, 2021

(86) PCT No.: PCT/US2021/034518
§ 371 (c)(1),
(2) Date: Dec. 2, 2022

(87) PCT Pub. No.: WO2021/247363
PCT Pub. Date: Dec. 9, 2021

(65) Prior Publication Data
US 2023/0212934 A1 Jul. 6, 2023

Related U.S. Application Data

(60) Provisional application No. 63/034,903, filed on Jun. 4, 2020.

(51) Int. Cl.
*E21B 44/00* (2006.01)
*E21B 47/00* (2012.01)
(Continued)

(52) U.S. Cl.
CPC .............. *E21B 44/00* (2013.01); *E21B 47/00* (2013.01); *G01V 1/50* (2013.01); *G06F 30/20* (2020.01);
(Continued)

(58) Field of Classification Search
None
See application file for complete search history.

(56) References Cited

U.S. PATENT DOCUMENTS 3,382,933 A 5/1968 Holtman
6,012,017 A * 1/2000 Van Bemmel ......... G01V 11/00
702/14

(Continued)

FOREIGN PATENT DOCUMENTS

WO 2019089490 A1 5/2019

OTHER PUBLICATIONS

Search Report and Written Opinion of International Patent Application No. PCT/US2021/034518 dated Sep. 1, 2021, 10 pages.
(Continued)

*Primary Examiner* — Lina Cordero
(74) *Attorney, Agent, or Firm* — Jeffrey D. Frantz

(57) ABSTRACT

The present disclosure relates to systems, methods, and non-transitory computer-readable media for dynamically utilizing offset drill-well data generated within a threshold geographic area to determine formation-top trends and identify formation-top depths at a subject drill-well site. To do so, in some embodiments, the disclosed systems estimate a variogram for observed formation-top depths of a subset of offset drill-wells, and, in turn, map a predicted response from the estimated variogram. For example, using weighted combinations (e.g., with Kriging weights) of the formation-top depths of the subset of offset drill-wells, the disclosed systems can map a continuous surface of a formation and
(Continued)

identify a top-depth thereof. Moreover, the disclosed system can do so for multiple formations at the subject drill-well site, and (in real-time in response to a user input) provide for display at a client device, the associated formation-top depths, various predicted drilling events and/or predicted drilling metrics.

20 Claims, 21 Drawing Sheets

(51) Int. Cl.
*G01V 1/50* (2006.01)
*G01V 20/00* (2024.01)
*G06F 30/20* (2020.01)

(52) U.S. Cl.
CPC .......... *E21B 2200/20* (2020.05); *G01V 20/00* (2024.01); *G01V 2210/6652* (2013.01)

(56) References Cited

U.S. PATENT DOCUMENTS

| | | |
|---|---|---|
| 2002/0103630 A1 | 8/2002 | Aldred et al. |
| 2011/0036587 A1 | 2/2011 | Pritchard et al. |
| 2011/0184711 A1 | 7/2011 | Altman et al. |
| 2011/0216066 A1* | 9/2011 | Calvo ..................... E21B 43/00 345/440 |
| 2014/0350856 A1* | 11/2014 | Lambie ................... G01W 1/00 702/3 |
| 2017/0328181 A1 | 11/2017 | Kristjansson |
| 2021/0340861 A1* | 11/2021 | Al Ismail ............... G01V 11/00 |
| 2022/0106630 A1 | 4/2022 | Kanavarioti |

OTHER PUBLICATIONS

Extended Search Report issued in European Patent Application No. 21818230.1 dated Jun. 7, 2024, 4 pages.

* cited by examiner

PREDICTING FORMATION-TOP DEPTHS AND DRILLING PERFORMANCE OR DRILLING EVENTS AT A SUBJECT LOCATION

CROSS REFERENCE PARAGRAPH

This application is a National Stage Entry of International Application No. PCT/US2021/034518, filed May 27, 2021, which claims the benefit of U.S. Provisional Application No. 63/034,903, entitled "PREDICTING FORMATION-TOP DEPTHS AND DRILLING PERFORMANCE OR DRILLING EVENTS AT A SUBJECT LOCATION," filed Jun. 4, 2020, the disclosure of which is hereby incorporated herein by reference.

BACKGROUND

Recent years have seen significant improvements in computer systems for modeling geological structures, such as subsurface reservoirs of mineral or hydrocarbon deposits. In connection to these advancements, exploration and drilling techniques have likewise developed with the advent of increased resources of geological data, drilling data, and the like. Unfortunately, a number of problems exist with conventional systems for identifying potentially new drilling locations, for example, due to decreased modeling efficiency and/or modeling accuracy, increased computational overhead, and decreased flexibility of model generation/evaluation.

With respect to decreased modeling efficiency and/or modeling accuracy, some systems have limited quantities of drill-well data, for example, based on a few drill-wells (if any). Thus, to identify a possible location for a new drill-well with reasonable accuracy, these systems may first require building a reservoir model. To do so, such an approach typically involves time-intensive and data-intensive processes such as "seismic to simulation" (which entails computer-implemented processes of identifying a relationship between petrophysical rock properties and elastic rock properties, implementing seismic inversion techniques to combine seismic data and drill-well data, performing stratigraphic grid transfer, and validating/ranking models). Still further, this approach often involves a high degree of expert interpretation of software data and location-specific geological know-how to parameterize, fine-tune, and/or correct model predictions. Thus, depending on the reservoir size and/or field size (the Permian Basin is 86,000 square miles for reference), building a reservoir model can involve a massive undertaking in terms of time and data resources. Moreover, to do so for identifying at least one new drill-well location is extremely inefficient. On the other hand, omitting use of a reservoir model and building a local geological model from a limited dataset based on a small number of drill-wells leads to inaccurate geological models (e.g., that misrepresent geological formations).

As mentioned above, some conventional systems also suffer from increased computational overhead, for example, to identify attributes of a new drill-well location. In particular, conventional systems that utilize information from a reservoir model to explore potential drill-well locations may perform computational processes to store the reservoir model, access or transmit reservoir model data (e.g., to provide for display at a user device), update the reservoir model, filter reservoir model data, etc. This, as described above, can include a massive undertaking of computational resources. Moreover, in doing so, these conventional systems waste computational resources to process various aspects of the reservoir model that have little or no relationship to a potential new drill-well location (e.g., portions of the reservoir model that are far away from such a potential new drill-well location). That is, these conventional systems consume excess storage bandwidth and/or excess data transmission bandwidth to identify data from an entire reservoir model for informing geological interpretation with respect to a potential new drill-well site.

In addition, some conventional systems involve increased rigidity of model generation and/or evaluation. As described above for example, some systems necessarily rely on a reservoir model and/or a geologist's expert interpretation thereof in order to generate information about a potential new drill-well site. These systems therefore require a certain implementation involving use of a reservoir model, without which the system can generate incorrect data regarding a potential new drill-well site. Due in part to the rigidity of such an approach, systems of new competitors looking at a potential new drill-well site may be forced to implement the necessary hardware and/or software able to handle the increased computational consumption of digital resources associated with the integrated utilization of a reservoir model. In addition, the need to impart expert data interpretation to a reservoir model on a location-by-location basis suggests the approach of some conventional systems are increasingly rigid, cumbersome, and over-reliant on subjective assessments. Moreover, such approaches can add further rigidity or complexity due to the numerous software applications and user interfaces involved from disparate sources. For example, not all software applications can integrate data from other platforms for reasons of compatibility (e.g., file-type incongruences, unavailability of application programming interfaces, etc.). In addition, switching between software applications for analyzing and/or modeling data can add further complexity, limit functionality, and/or cause excess user interactions.

SUMMARY

Aspects of the present disclosure can include methods, computer-readable media, and systems that dynamically utilize offset drill-well data generated within a threshold geographic area to determine formation-top trends and identify formation-top depths at a coordinate location. In particular, the disclosed systems can receive, from a client device, a user selection identifying a coordinate location at which formation-tops are desired. In response to receiving such a user selection, the disclosed systems can intelligently identify, among a large set of drill-wells, a specific subset of offset drill-wells near the coordinate location. The subset of offset drill-wells are associated with respective drilling data, including formation-top depths and other drilling-related experience data. The disclosed systems utilize the respective drilling data to generate formation-top trends in areas between the subset of offset drill-wells. The formation-top trends can honor the observed formation-top depths and other drilling-related experience data for the subset of offset drill-wells while also preserving the geological feasibility in areas therebetween. To do so, in some embodiments, the disclosed systems estimate a variogram for the observed formation-top depths of the subset of offset drill-wells, and, in turn, map a predicted response from the estimated variogram. For example, using weighted combinations (e.g., with Kriging weights) of the formation-top depths of the subset of offset drill-wells, the disclosed systems can map a continuous surface of a formation and identify a top-depth thereof. Moreover, the disclosed system can do so for multiple formations at the identified location coordinate, and (in real-time in response to a user input) provide for display at a client device, the associated formation-top depths, various predicted drilling events and/or predicted drilling metrics.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
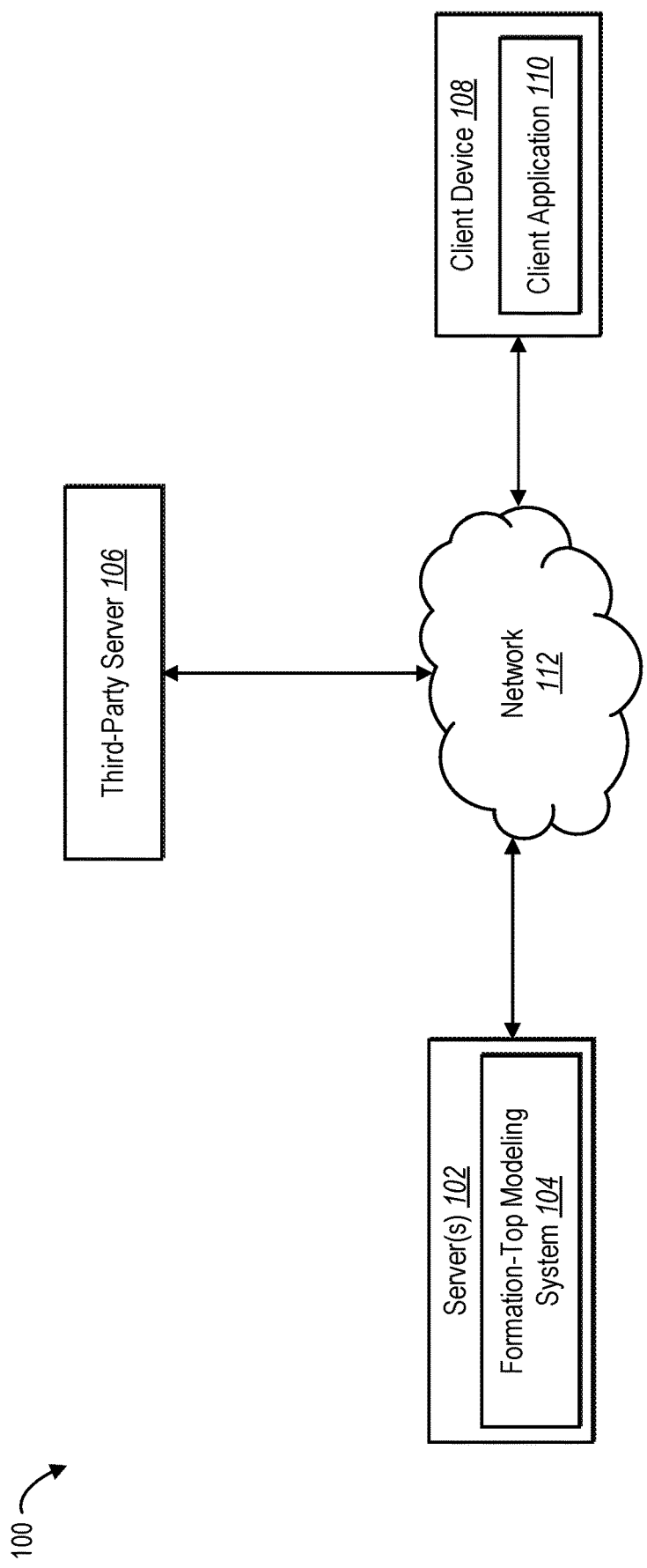
FIG. 1 illustrates a diagram of a system including a formation-top modeling system in accordance with one or more embodiments.

One or more embodiments described herein include a formation-top modeling system that selectively utilizes drill-well data from neighboring drill-wells of a threshold geographic area to determine formation-top trends and identify formation-top depths at a coordinate location. For example, in one or more embodiments, the formation-top modeling system can determine a location of a subject drill-well site (e.g., according to a user input at a client device) and then identify drill-well data for a subset of drill-wells positioned within a threshold geographic area relative to the location of the subject drill-well site. Additionally, using the drill-well data for the subset of drill-wells comprising observed data points of formation-top depths, the formation-top modeling system can generate formation-top trends across portions of the threshold geographic area between positions of the subset of drill-wells (including at the location of the subject drill-well site).

In some embodiments, generating the formation-top trends comprises the formation-top modeling system estimating a spatial dependence between the subset of drill-wells, for example, by estimating a variogram for the observed formation-top depths. In turn, the formation-top modeling system can map a continuous surface of a formation-top reflecting the geological variations thereof (e.g., according to a true vertical depth and relative to the location of the subject drill-well site). In this manner, the formation-top modeling system can predict formation-top depths for multiple formations and provide the same for display at a client device with little or no user interaction and without a reservoir model. Additionally, in some embodiments, the formation-top modeling system can determine optimal drilling parameters and bottom-hole assemblies based on predicted drilling performance metrics and predicted drilling events for drilling through formations at the predicted formation-top depths at the location of the subject drill-well site.

As just mentioned, the formation-top modeling system can identify drill-well data for a subset of drill-wells positioned within a threshold geographic area relative to a location of a subject drill-well site. In more detail, the formation-top modeling system can execute one or more computer-implemented methods in response to receiving an indication of a user input from a client device (e.g., a user selection identifying the location of the subject drill-well site). For example, based on determining the location of the subject drill-well site, the formation-top modeling system can identify a threshold geographic area in which a statistically significant number of drill-wells are positioned. In some implementations, the formation-top modeling system may utilize a field database comprising location data for drill-wells, based on which the formation-top modeling system can select a subset of drill-wells associated with location coordinates that are positioned within a threshold geographic area (e.g., a five-mile radius, ten-mile radius, and so forth).

From the identified subset of drill-wells, the formation-top modeling system can generate formation-top trends across portions of the threshold geographic area between positions of the subset of drill-wells (including at the location of the subject drill-well site). To do so for example, the formation-top modeling system can estimate a variogram for the observed formation-top depths and weight the same (e.g., utilizing Kriging weights). In some implementations, estimating the variogram to determine weighted combinations for the observed formation-top depths involves the formation-top modeling system identifying sets of formation-top-depth covariances (e.g., a first set of formation-top-depth covariances between respective positions of the subset of drill-wells, a second set of formation-top-depth covariances between the location of the subject drill-well site and the respective positions of the subset of drill-wells, etc.). In turn, based on weighted combinations of the observed formation-top depths, the formation-top modeling system can map formation-tops (e.g., as continuous surfaces) between the respective positions of the subset of drill-wells.

Utilizing the formation-top trends, the formation-top modeling system can determine the formation-top depths for formations corresponding to the location of the subject drill-well site. Specifically, using the mapped formation-tops discussed above, the formation-top modeling system can identify the formation-top depths according to the depths of mapped surfaces. Based on the formation-top-depth determination, the formation-top modeling system can provide, for display at a user interface of a client device, the formation-top depths (e.g., Rhinestreet formation at −5,080 ft., Cashaqua formation at −5,250 ft., Middlesex formation at −5,293 ft., etc.).

In addition to the formation-top depths, the formation-top modeling system can determine and provide, for display at a user interface of a client device, various predictions and/or recommendations that relate to drilling at the location of the subject drill-well site. For example, based on the formation-top depths of the formations predicted at the location of the subject drill-well site, the formation-top modeling system can generate configurable drilling parameters for optimizing predicted drilling performance metrics (e.g., rate of penetration, dog-leg severity, etc.) and/or predicted drilling events (e.g., downhole failure, stuck pipe, tight hole, kick, lost circulation, etc.). Similarly, the formation-top modeling system can determine and/or recommend bottom-hole assemblies (BHAs), drill-bit selections, mud selections, etc. for drilling through the formations predicted at the location of the subject drill-well site (e.g., BHAs that increases a predicted drilling performance metric, reduces a likelihood of a predicted undesirable drilling event, lowers costs, etc.).

The formation-top modeling system provides several advantages over conventional systems. As one example, the formation-top modeling system can increase a modeling efficiency and/or modeling accuracy by utilizing a field database of observed drill-well data for numerous drill-wells. For instance, rather than undergoing a time-intensive process to build a reservoir model as some conventional systems rely on, the formation-top modeling system can utilize a threshold number of drill-well data points (e.g., comprising formation-top depths) from the field database and generate formation-top trends for a geographic area. Utilizing the threshold number of drill-well data points of the field database can promote model accuracy for the formation-top trends, while also increasing a modeling efficiency and/or speed in comparison to building a reservoir model.

In addition, the formation-top modeling system can decrease computational overhead relative to conventional systems, particularly those that utilize a reservoir model. For example, in utilizing the field database mentioned above, the formation-top modeling system can decrease storage consumption and/or transmission bandwidth by generating formation-top trends. For instance, instead of leveraging a resource-intensive reservoir model, the formation-top modeling system can extract formation-top depths from the field database that use orders of magnitude less storage and transmission bandwidth. Moreover, the formation-top modeling system can selectively identify a threshold geographic area for extracting drill-well data and generating formation-top trends in a localized area, thereby further decreasing computational overhead.

The formation-top modeling system can also increase flexibility of model evaluation. For example, the formation-top modeling system can determine formation-top depths at a subject location independent of a reservoir model or any expert data interpretation. For instance, the formation-top modeling system can, with little or no user interaction, generate formation-top depths at a subject location. Additionally or alternatively, the formation-top modeling system can utilize the formation-top depths to predict drilling performance and/or drilling events for drilling through formations associated with the formation-top depths at the subject location. In this case, the formation-top modeling system can provide one or more user interfaces on a client device that allow for user selection of a new potential drill site as the subject location. In response to an indication of a user selection, the formation-top modeling system can provide to the client device the formation-top depths for the subject location without the client device switching applications, uploading data, providing analysis, necessitating further user interaction, etc. In addition, the formation-top modeling system can provide, at a user interface of the client device, configurable drilling parameters for optimizing a predicted drilling performance metric or a predicted drilling event at the subject location. Thus, the formation-top modeling system can provide a one-stop-shop for new drill-site exploration, but without the undue complexity of user interaction with multiple data sources and without rigidity of conventional systems that typically require expert data interpretation of a reservoir model.

As illustrated by the foregoing discussion, the present disclosure utilizes a variety of terms to describe features and benefits of the formation-top modeling system. Additional detail is now provided regarding the meaning of these terms. For example, as used herein, the term "drill-well" refers to a structure by which machinery can drill through geological "formations" (e.g., rock strata). In particular, a drill-well may include a surface to sub-surface structure for extracting mineral or hydrocarbon deposits from a subterranean reservoir. In some implementations, the formation-top modeling system may utilize "drill-well data" (i.e., data corresponding to one or more drill-wells) for a threshold number of drill-wells. As referred to herein, a "threshold number" of drill-wells may include a predetermined minimum number of drill-wells, a minimum number of drill-wells to generate formation-top trends with a threshold accuracy or confidence score, a minimum number of drill-wells to satisfy a statistical threshold (e.g., statistical significance, a certain p value, etc.), and the like.

As further used herein, the term "formation-top trends" refers to geological patterns of formations. In particular, formation-top trends can include geological patterns of surface tops for individual formation layers that make up rock strata. Such formation layers can vary in horizontal and/or vertical directions. For example, some formations may be relatively thick in some locations, relatively thin in other locations, and absent in yet other locations. To represent this geospatial data, formation-top trends can indicate a pattern of "formation-top depths" (i.e., depths of individual formation surface tops). For example, the formation-top modeling system can generate formation-top trends which predict how formation-top depths of formations vary from location to location among specific drill-wells. In these or other embodiments, formation-top depths can include various types of depths, indications of depth, and/or depth reference datums (e.g., measured depth, true vertical depth, along hole depth, below ground level depth, below rotary table depth, depth to/from mudline, depth from a rotary kelly bushing, subsea level depth, total depth, etc.). Furthermore, the formation-top modeling system can map formation-top depths as continuous subterranean surfaces (i.e., representing individual formation surface tops), for example, as described more below in relation to FIGS. 4D-4G upon determining a spatial dependence.

As used herein, the term "spatial dependence" refers to one or more geospatial relationships among a set of data points. In particular, a spatial dependence can quantitatively describe the geospatial relationship between formation-top depths for observed drill-wells. In these or other embodiments, the formation-top modeling system can utilize a "variogram," which as used herein, refers to a measure of spatial continuity of data. For example, utilizing a variogram, the formation-top modeling system can determine an amount of variability between formation-top depths for observed drill-well data. In some cases, the formation-top modeling system utilizes a Kriging variogram to determine "formation-top-depth covariances" (i.e., statistical covariance values for formation-top depths). In these cases, the formation-top modeling system can determine "Kriging weights," which as used herein, refer to numerical variables for applying to formation-top depths of observed drill-wells. In applying the Kriging weights to the formation-top depths, the formation-top modeling system can account for spatial dependence between drill-wells.

As further used herein, the term "threshold" in conjunction with a threshold geographic area refers to a sub-region or portion of a larger region. In particular, a threshold geographic area can include a configurable perimeter that includes a "subject drill-well site" (i.e., a location for a potential new drill-well). As an example, the threshold geographic area may include a five-mile radius, a ten-mile radius, etc. relative to a subject drill-well site. In these or other embodiments, a threshold geographic area may include a threshold number of observed drill-wells out of a larger set of drill-wells pertaining to, for instance, an entire oil field. Additionally or alternatively, in some embodiments, the formation-top modeling system can receive "location coordinates" (e.g., location data, global positioning system (GPS) coordinates, etc.) according to one or more user inputs that define the threshold geographic area and/or the subject drill-well site. Examples of user inputs include user interactions with a user interface at a client device to provide alphanumeric inputs, move or tap-to-place a "location pin-drop" (i.e., a user interface element denoting location coordinates), and the like.

Additionally, as used herein, the term "drilling performance metric" refers to a value or attribute associated with drilling through formations at a drill-well. Examples of a drilling performance metric can include rate of penetration, dog-leg severity, an efficiency/cost metric, safety levels, etc. In these or other embodiments, the formation-top modeling system can identify drilling performance metrics by retrieving drill-well data from a "field database" (i.e., a memory device, storage server, etc. that comprises drill-well data for observed drill-wells). However, at subject drill-well sites, the formation-top modeling system can generate predicted drilling performance metrics, for example, as described more below in relation to FIGS. 6B-6C.

As also used herein, the term "drilling event" refers to a drilling-related occurrence, incident, or time-span. Examples of drilling events can include rig non-productive time, bit trip, twist off, mud motor failure, rotary steerable systems failure, measurement while drilling failure, surface waiting, wellbore instability, downhole tool failure, tight hole, influx, stuck pipe, gas, lost circulation, and the like. As with the drilling performance metric, the formation-top modeling system can identify drilling events by retrieving drill-well data from a field database of observed drill-wells. However, at subject drill-well sites, the formation-top modeling system can generate predicted drilling events, for example, as described more below in relation to FIGS. 6A and 6C.

As additionally used herein, the term "drilling parameters" refers to drilling-related variables that can affect drilling performance metrics and drilling events. Examples of drilling parameters can include torque, rotations per minute (RPM), weight on bit, hookload, mud flow rate in, standpipe pressure, etc. As described more below in relation to FIGS. 6A-6C, the formation-top modeling system can optimize drilling parameters and/or determine a bottom-hole assembly (BHA) to increase a predicted drilling performance metric, reduce a likelihood of a predicted drilling event, lower a cost metric, etc.

As also used herein, the term "optimize" or "optimal" refers to an improvement, enhancement or local optima. In particular, optimizing does not necessarily refer to an absolute optima, true optimization or the best, although an absolute optima or best may still be covered by the present disclosure. For example, an optimization process may improve a drilling performance metric, reduce a likelihood of a drilling event, lower a cost metric, find the best solution, and/or may verify that an existing solution is a local optima or an absolute optima and thus should not be modified or changed.

Additional detail will now be provided regarding the formation-top modeling system in relation to illustrative figures portraying example embodiments and implementations. For example, FIG. 1 illustrates a computing system environment (or "environment") 100 for implementing a formation-top modeling system 104 in accordance with one or more embodiments. As shown in FIG. 1, the environment 100 includes server(s) 102, a third-party server 106, a client device 108, and a network 112. Each of the components of the environment 100 can communicate via the network 112, and the network 112 may be any suitable network over which computing devices can communicate. Example networks are discussed in more detail below in relation to FIG. 11.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 11. Although FIG. 1 illustrates a single client device 108, in some embodiments the environment 100 can include multiple client devices 108. The client device 108 can further communicate with the server(s) 102 via the network 112. For example, the client device 108 can receive user input and provide information pertaining to the user input (e.g., that relates to location coordinates for a subject drill-well site) to the server(s) 102. Additionally or alternatively, in some implementations, the client device 108 can receive user input comprising drill-well data for one or more drill-wells.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including information that is responsive to one or more user inputs. For example, the formation-top modeling system 104 can instruct the client application 110 to display, at a user interface of the client device 108, formation-top depths for formations corresponding to a location of a subject drill-well site. In addition, the user can interact with the client application 110 to provide user input to, for example, modify drilling parameters and determine a custom BHA selection, drill-bit selection, mud selection, etc. that can increase a drilling performance metric, decrease a likelihood of a drilling event, and/or lower a cost metric.

As mentioned, the environment 100 includes the third-party server 106. The third-party server 106 can include a variety of computing devices as described in relation to FIG. 11. In some embodiments, the third-party server 106 can generate and/or store drill-well data for observed drill-wells included in one or more geographic regions. For example, the third-party server 106 may include a field database (e.g., with drill-well data for all Permian Basin drill-wells) from which the formation-top modeling system 104 can retrieve and/or request data. Although FIG. 1 illustrates a single third-party server 106, in some embodiments the environment 100 can include multiple different third-party servers 106. In addition, the third-party server 106 can communicate with the server(s) 102 via the network 112 or multiple client devices.

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server. In particular, the server(s) 102 may learn, generate, store, receive, and transmit electronic data, such as executable instructions for generating formation-top trends, determining formation-top depths, predicting a drilling performance metric and/or drilling event, and the like. For example, the server(s) 102 may receive data from the client device 108 based on user input to provide location coordinates for a subject drill-well site. In turn, the server(s) 102 can transmit data to one or more components in the environment 100. For example, the server(s) 102 can retrieve drill-well data from the third-party server 106 for drill-wells positioned within a threshold geographic area relative to the subject drill-well site. Based on the drill-well data for drill-wells positioned within the threshold geographic area, for example, the server(s) 102 may generate formation-top trends. Using the formation-top trends, the server(s) 102 can determine the formation-top depths and provide, for display at the client device 108, the formation-top depths for the formations corresponding to the location of the subject drill-well site. Additionally, in some implementations, the server(s) 102 can provide, for display at the client device 108, at least one of a predicted drilling performance metric or a predicted drilling event for drilling through the formations corresponding to the formation-top depths at the location of the subject drill-well site. These and other example communications between the server(s) 102 and other components of the environment 100 are herein contemplated.

Although FIG. 1 depicts the formation-top modeling system 104 located on the server(s) 102, in some embodiments, the formation-top modeling system 104 may be implemented by one or more other components of the environment 100 (e.g., by being located entirely or in part at one or more of the other components). For example, the formation-top modeling system 104 may be implemented by the client device 108, the third-party server 106, and/or another suitable device.

In some embodiments, though not illustrated in FIG. 1, the environment 100 may have a different arrangement of components and/or may have a different number or set of components altogether. For example, the client device 108 and/or the third-party server 106 may communicate directly with the formation-top modeling system 104, bypassing the network 112.

Figure 2:
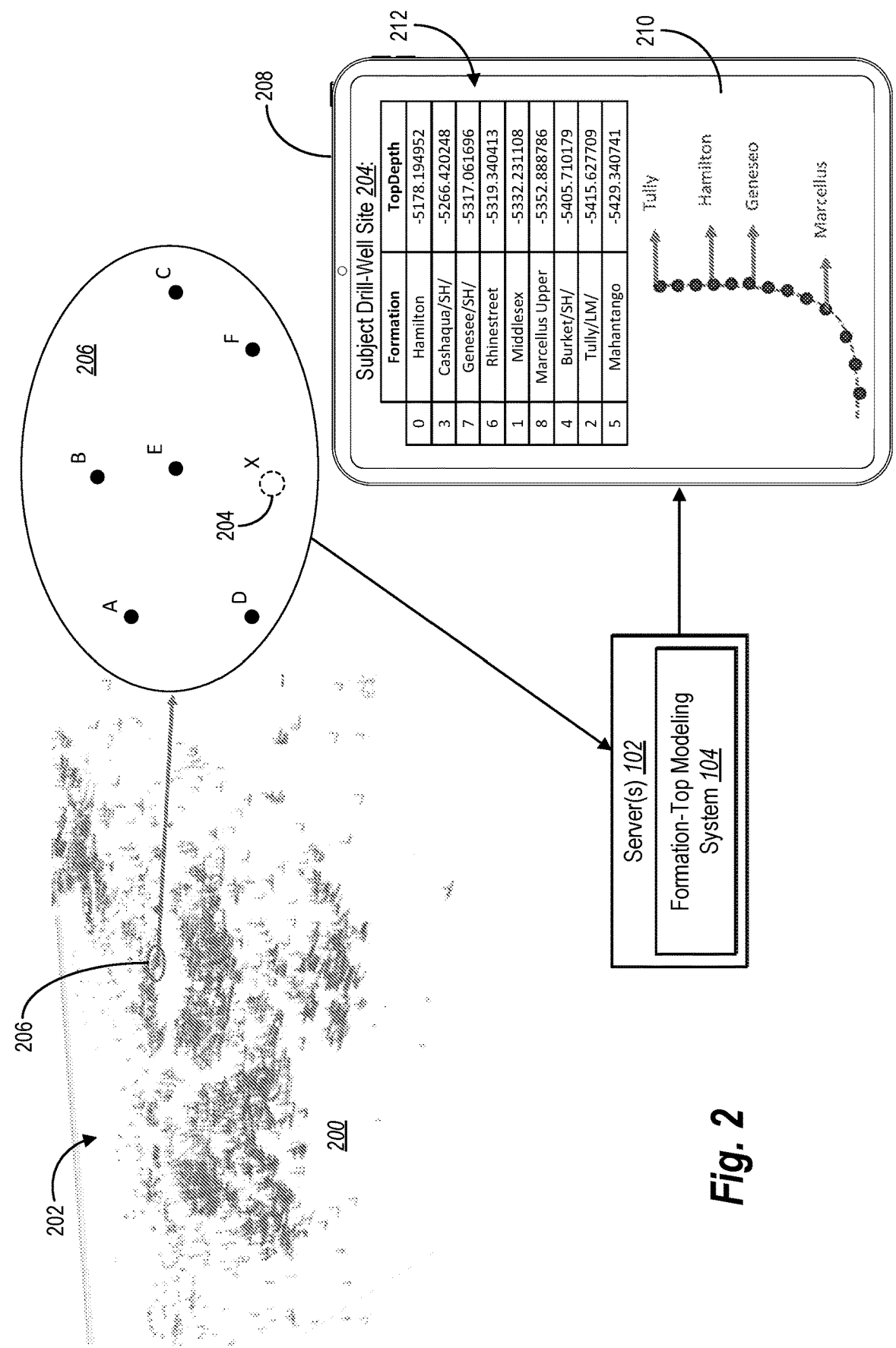
FIG. 2 illustrates a diagram of a formation-top modeling system identifying neighbor drill-wells and providing predicted formation-top depths of a subject drill-well site for display at a client device in accordance with one or more embodiments.

As mentioned above, the formation-top modeling system 104 can determine formation-top depths at a subject drill-well site, for example, utilizing drill-well data corresponding to drill-wells of a threshold geographic area. In so doing, the formation-top modeling system 104 can increase system efficiencies, decrease computational overhead, and simplify user interactions. FIG. 2 therefore illustrates a diagram of the formation-top modeling system 104 identifying neighbor drill-wells A-F of a threshold geographic area 206 relative to a subject drill-well site 204 and providing predicted formation-top depths 212 of the subject drill-well site 204 for display at a client device 208 in accordance with one or more embodiments.

As shown, a region 200 can include hundreds, thousands, or tens of thousands of drill-wells 202. In these or other embodiments, the drill-wells 202 comprise observed drill-wells and are associated with drill-well data in a field database. Thus, in response to receiving a user selection identifying the location of the subject drill-well site 204, the formation-top modeling system 104 can identify the threshold geographic area 206 comprising the neighbor drill-wells A-F. Specifically, for instance, the formation-top modeling system 104 can retrieve drill-well data from the field database for the neighbor drill-wells A-F. In so doing, the formation-top modeling system 104 can focus on generating formation-top trends utilizing drill-well data for the neighbor drill-wells A-F as opposed to drill-well data for the drill-wells 202 at large.

From the drill-well data associated with the neighbor drill-wells A-F positioned within the threshold geographic area 206, the formation-top modeling system 104 can then generate formation-top trends as described more below in relation to the following figures (e.g., utilizing the Kriging algorithm). In turn, based on the formation-top trends, the formation-top modeling system 104 can determine the formation-top depths 212 for formations corresponding to the location of the subject drill-well site 204. Moreover, the formation-top modeling system 104 can provide the formation-top depths 212 for display in a user interface 210 of the client device 208. Accordingly, the formation-top modeling system 104 can implement one or more acts and algorithms disclosed herein with little to no user interaction, and provide the formation-top depths 212, among other data, at the user interface 210 in a convenient manner requiring no further navigation to other user interfaces or software applications. Additionally, in some embodiments described further below, the formation-top modeling system 104 can determine optimal drilling parameters and BHAs based on predicted drilling performance metrics and predicted drilling events for drilling through formations at the formation-top depths 212 at the location of the subject drill-well site 204. The formation-top modeling system 104 can further display this data in addition to, or alternatively to, the formation-top depths 212 at the user interface 210 of the client device 208.

Figure 3:
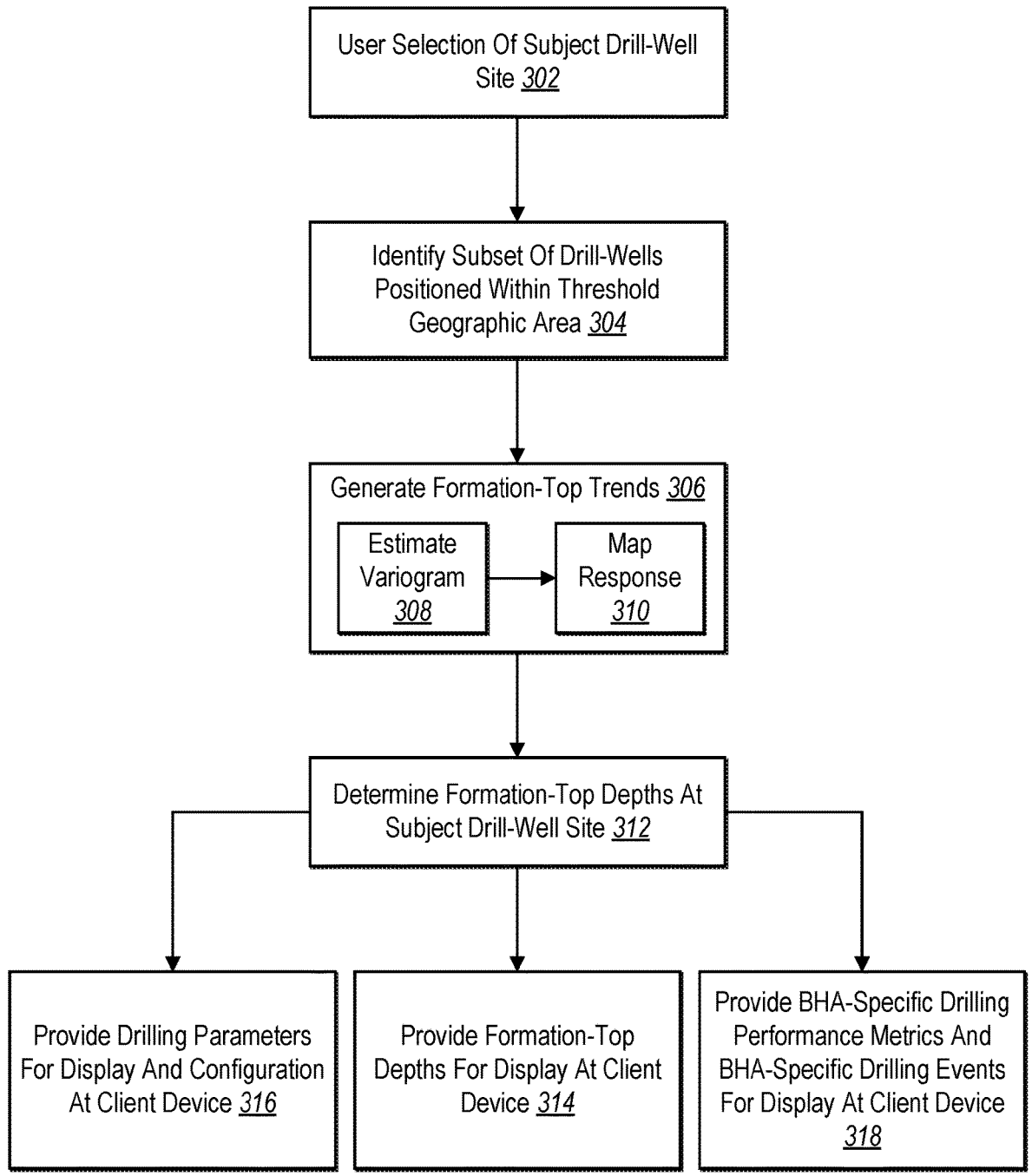
FIG. 3 illustrate a sequence flow comprising a formation-top modeling system generating formation-top trends and determining data therefrom to present at a client device in accordance with one or more embodiments.

As mentioned above, the formation-top modeling system 104 can selectively identify drill-wells and generate formation-top trends therebetween to determine formation-top depths in a user-friendly and resource-efficient manner. FIG. 3 therefore illustrates a sequence flow comprising the formation-top modeling system 104 generating formation-top trends and determining data therefrom to present at a client device in accordance with one or more embodiments. At act 302, the formation-top modeling system 104 can receive an indication of a user selection of a subject drill-well site from a client device. For example, as described more below in relation to FIG. 5A, the formation-top modeling system 104 can identify an indication of a user selection (e.g., a pin-drop location or user entry) as corresponding to a subject drill-well site.

At act 304, the formation-top modeling system 104 can identify a subset of drill-wells positioned within a threshold geographic area. To do so, the formation-top modeling system 104 may identify the metes and bounds of the threshold geographic area based on the location of the subject drill-well site. For example, as described more below in relation to FIG. 5B, the formation-top modeling system 104 can identify one or more threshold geographic areas relative to the subject drill-well site (e.g., a five-mile radius, a ten-mile radius, and so forth). In some implementations, if one or more of the threshold geographic areas relative to the subject drill-well site comprises fewer than a threshold number of drill-wells, the formation-top modeling system 104 may expand (i.e., enlarge the metes and bounds of) the threshold geographic area. For example, the formation-top modeling system 104 may iteratively search for drill-wells in increasingly larger geographic thresholds until at least the threshold number of drill-wells are positioned within a given threshold geographic area. After identifying the subset of drill-wells positioned within the geographic area, the formation-top modeling system 104 can then extract drill-well data (e.g., formation-top depths, drilling performance metrics, drilling events, etc.) corresponding to the subset of drill-wells for generating formation-top trends at act 306.

At act 306, the formation-top modeling system 104 can generate formation-top trends by determining a spatial dependence for formation-top depths between respective positions of the subset of drill-wells. From the spatial dependence for formation-top depths, the formation-top modeling system 104 can then identify weighted combinations of formation-top depths at the respective positions of the subset of drill-wells. In so doing, the formation-top modeling system 104 creates a quantitative understanding of how formation-top depths trend or change across the threshold geographic area. Thus, to perform these preparatory steps for generating a prediction of a formation-top depth at the subject drill-well site, the formation-top modeling system 104 can estimate a variogram at act 308 and map a response at act 310.

At act 308, the formation-top modeling system 104 analyzes the variance of the respective formation-top depths for the subset of drill-wells as a function of spatial distance between the corresponding locations of the subset of drill-wells. As described in more detail in relation to FIG. 4C, the formation-top modeling system 104 can determine the optimal variogram modeling parameters and, in turn, select a model (e.g., linear, spherical, exponential, etc.) that best fits or estimates the variogram. From the estimated variogram, the formation-top modeling system 104 can then determine weighted combinations (e.g., with Kriging weights) for the respective formation-top depths of the subset of drill-wells.

At act 310, the formation-top modeling system 104 can map the response (e.g., formation-top depths) across the threshold geographic area. As described in more detail below in relation to FIGS. 4D-4G, for instance, the formation-top modeling system 104 can plot formation-top depths at discrete locations based on the weighted formation-top depths of the n-nearest neighbor drill-wells of the subset of drill-wells. Additionally, the formation-top modeling system 104 can connect formation-top depths (e.g., the observed formation-top depths of the subset of drill-wells and/or the predicted formation-top depths at discrete locations) to represent continuous subterranean surfaces of the formations. In so doing, the formation-top modeling system 104 can honor the observed formation-top depths for the subset of drill-wells while also preserving the geological feasibility in locations therebetween.

At act 312, the formation-top modeling system 104 can determine the formation-top depths for the subject drill-well site based on the mapped response at act 310. For example, the formation-top modeling system 104 can compare the location of the subject drill-well site with the mapped response of the formation-top trends across the threshold geographic area to identify the formation-top depths at the location of the subject drill-well site indicated in the mapped response. In some implementations, the formation-top modeling system 104 identifies a depth for at least one of the continuous subterranean surfaces of a formation (mapped at act 310) corresponding to the location of the subject drill-well site.

Figure 5B:
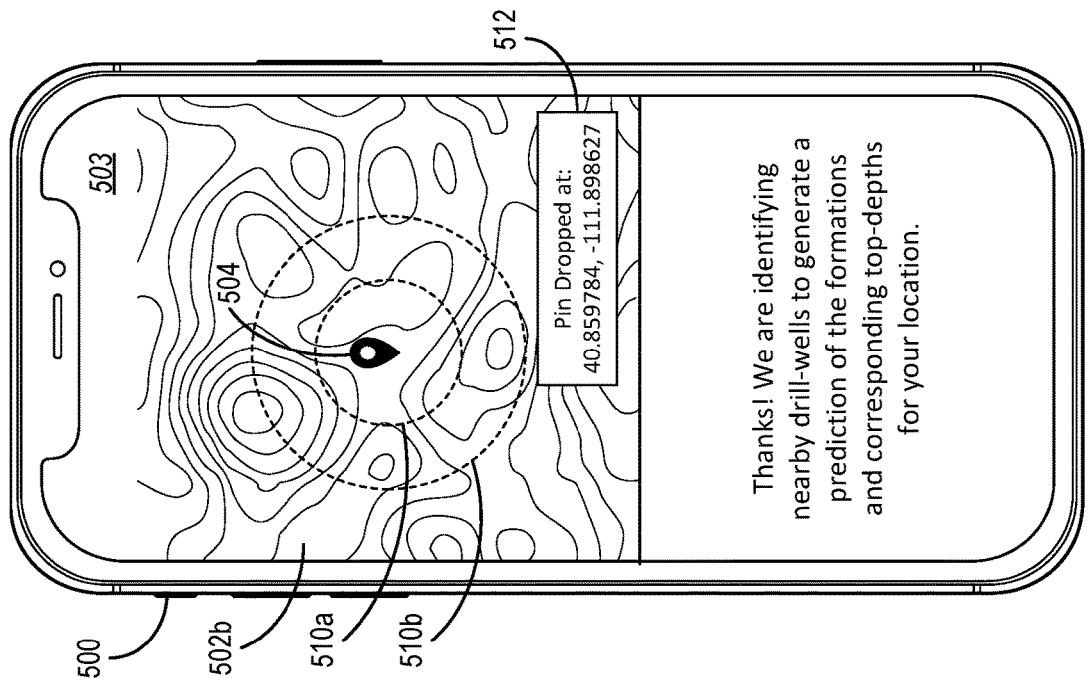
FIGS. 5A-5B illustrate user interfaces on a computing device for initiating formation-top depth generation in accordance with one or more embodiments.
Figure 5A:
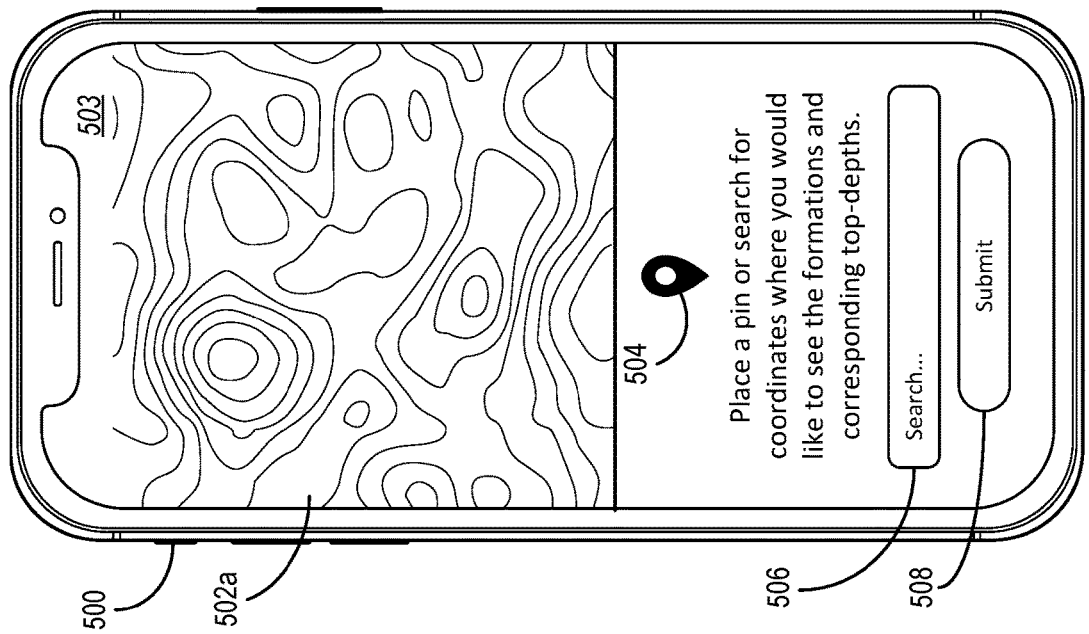
Figure 5C:
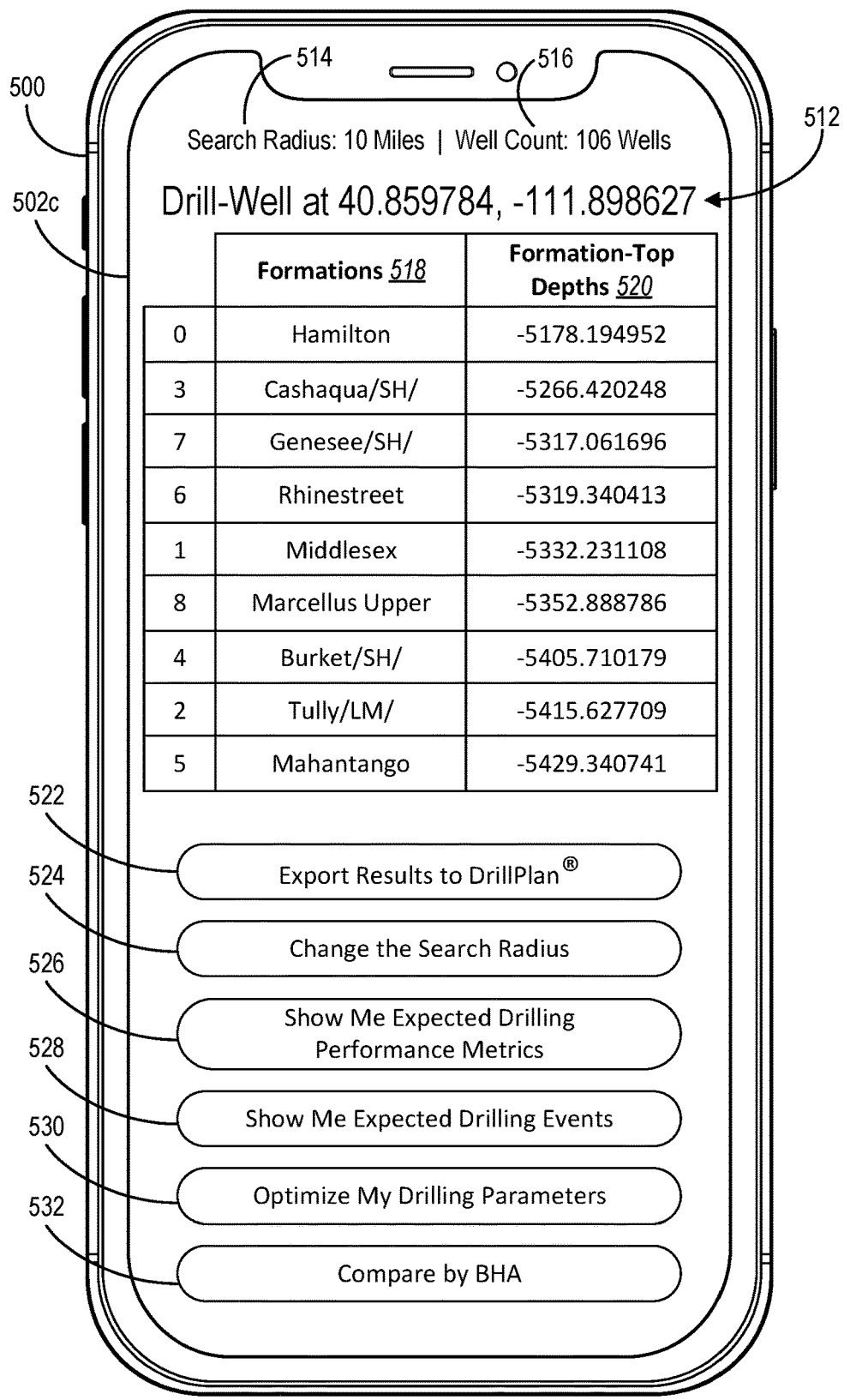
FIG. 5C illustrates a user interface on the computing device for generating formation-top depths at a subject drill-well site in accordance with one or more embodiments.

At acts 314-318, the formation-top modeling system 104 can provide, for display at a client device, various data (e.g., for user interaction at a user interface of the client device) based on the determined formation-top depths at act 312. For example, at act 314, the formation-top modeling system 104 can provide, for display at the client device, the formation-top depths corresponding to the location of the subject drill-well site (e.g., as shown in FIG. 2 and FIG. 5C). In some implementations, the formation-top modeling system 104 can present, for user selection at the client device, various selectable options to export, analyze, modify, and/or use the data to perform additional acts or algorithms (e.g., as shown and described in relation to FIG. 5C).

Similarly, the formation-top modeling system 104 at act 316 can provide, for display at the client device, configurable drilling parameters. For instance, based on the formation-top depths determined at act 312, the formation-top modeling system 104 can generate configurable drilling parameters (e.g., torque, RPM, hookload, etc.) for optimizing predicted drilling performance metrics like rate of penetration and/or predicted drilling events like downhole failure. In particular, the formation-top modeling system 104 can provide these drilling parameters to a user interface (e.g., as shown and described in relation to FIG. 6C) that is responsive to user interactions. For example, in response to an indication of a user interaction with the user interface at the client device, the formation-top modeling system 104 can modify one or more drilling parameters and correspondingly cause the user interface to present a modified predicted drilling performance metric.

At act 318, the formation-top modeling system 104 can provide, for display at the client device, BHA-specific drilling performance metrics and/or BHA-specific drilling events (e.g., as shown and described below in relation to FIGS. 6A-6B). In particular, the formation-top modeling system 104 can provide BHA-specific drilling performance metrics and/or BHA-specific drilling events for one or more formations that are predicted to be located at the subject drill-well site. For example, given a formation-top depth prediction for the Rustler formation at the subject drill-well site, the formation-top modeling system 104 may provide rate of penetration data for the Rustler formation observed at the n-nearest neighbor drill-wells that utilized a specific BHA. In this manner, the formation-top modeling system 104 can illustrate and/or recommend a particular BHA for drilling through one or more formations at the subject drill-well site.

Additionally or alternatively, at act 318 the formation-top modeling system 104 can provide, for display at the client device, drilling performance metrics and/or drilling events that are specific to other customizable drilling implementations (e.g., drill-bit selection, mud selection, polycrystalline diamond cutter (PDC) selection, and the like). For example, given a formation-top depth prediction for the Rustler formation at the subject drill-well site, the formation-top modeling system 104 may provide rate of penetration data for the Rustler formation observed at the n-nearest neighbor drill-wells that utilized a specific drill-bit, mud formulation, or PDC configuration/composition. In this manner, the formation-top modeling system 104 can also illustrate and/or recommend other suitable drilling implementations for drilling through one or more formations at the subject drill-well site.

Figure 4A:
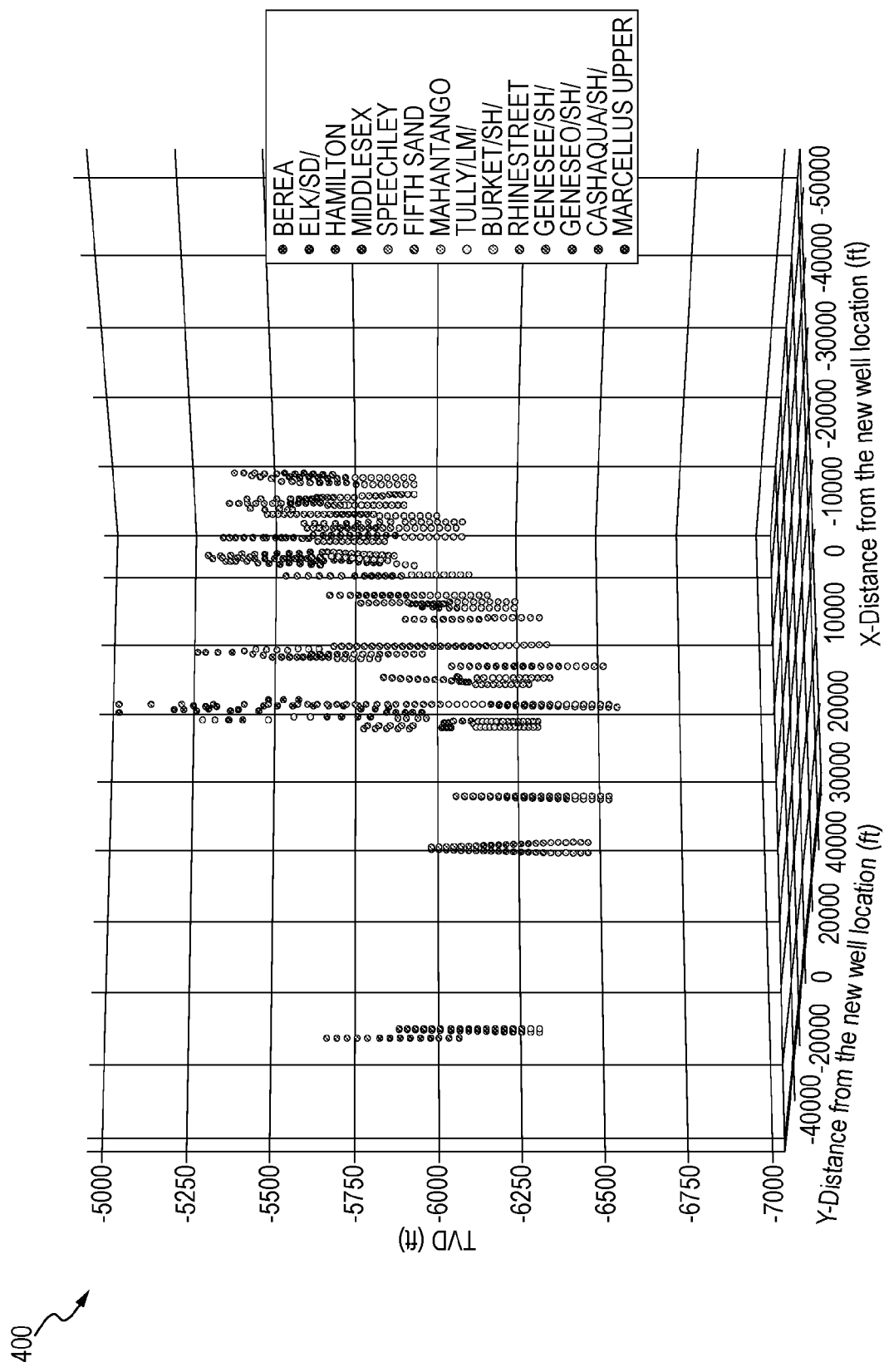
FIG. 4A illustrates a chart indicating formation-top depths for formations corresponding to a subset of drill-wells identified by a formation-top modeling system in accordance with one or more embodiments.

As mentioned above, the formation-top modeling system 104 can generate formation-top trends for a threshold geographic area, for example, between respective positions of a subset of drill-wells associated with observed drill-well data. Thus, in response to determining a location of a subject drill-well site, the formation-top modeling system 104 can, for a threshold geographic area, identify drill-well data corresponding to a subset of drill-wells located within the threshold geographic area. FIG. 4A therefore illustrates a chart 400 indicating formation-top depths for formations corresponding to a subset of drill-wells identified by the formation-top modeling system 104 in accordance with one or more embodiments. In particular, the chart 400 indicates the observed formations (and associated formation-top depths) corresponding to each drill-well of the subset of drill-wells in relation to a subject drill-well site located at the (x,y) origin. As may be apparent from the chart 400, there is a great deal of variation in formation-top depths across the threshold geographic area. This variation includes not only variation in formation-top depth, but also in the formations themselves. For example, some drill-wells are associated with a first set of formations and other drill-wells are associated with a second set of formations different from the first set of formations. Accordingly, this raw drill-well data of itself does not indicate what the formation-top depths are for the subject drill-well site, but instead only indicate its neighbors' formation-top depths.

Figure 4B:
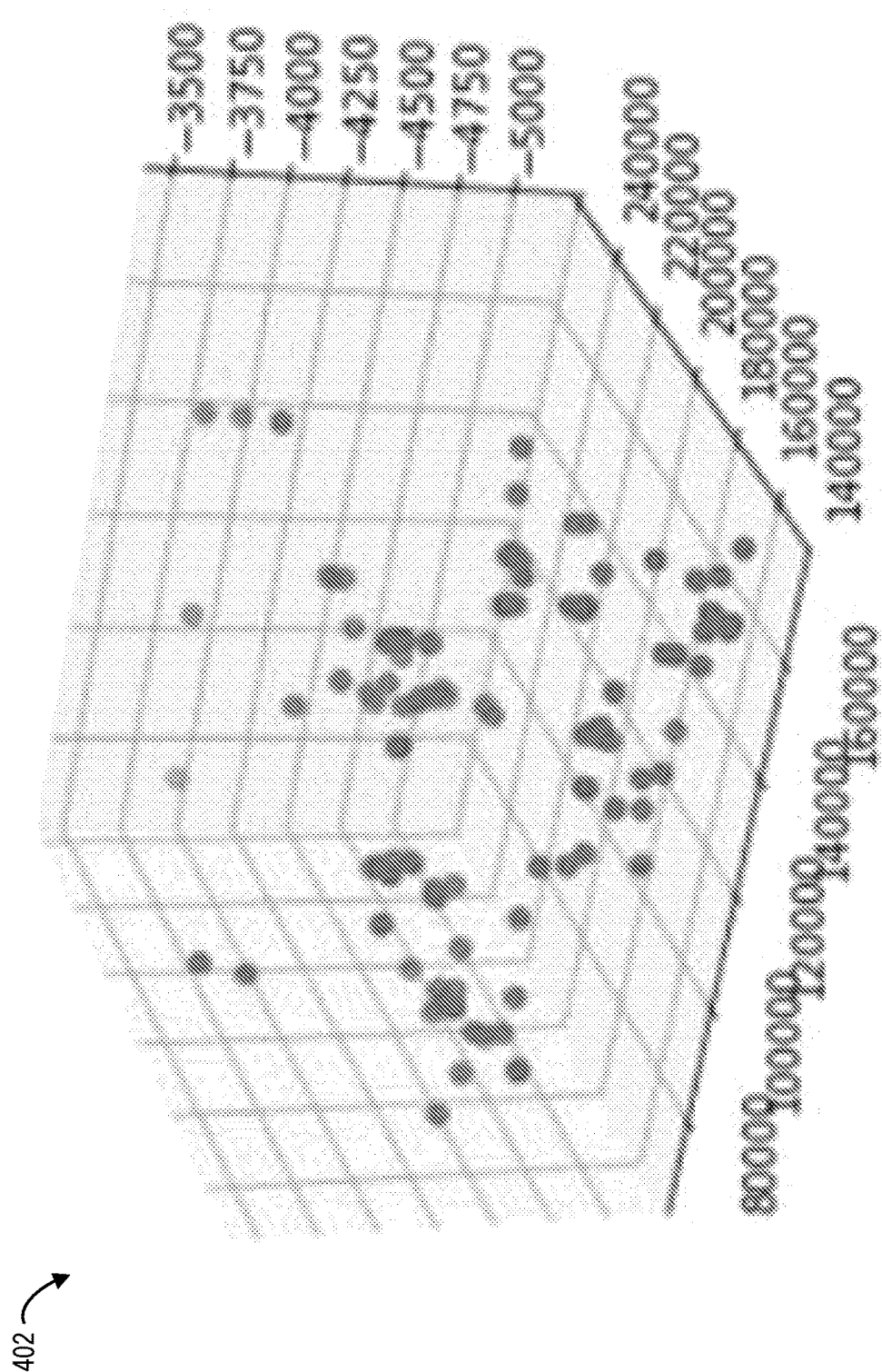
FIG. 4B illustrates a chart indicating formation-top depths for a formation corresponding to a subset of drill-wells in accordance with one or more embodiments.

Similarly, FIG. 4B illustrates a chart 402 indicating formation-top depths for a formation corresponding to a subset of drill-wells in accordance with one or more embodiments. In particular, the chart 402 indicates that, among one example formation, the formation-top depth can vary greatly across a threshold geographic area for the subset of drill-wells. For example, according to the drill-well data for the subset of drill-wells, some drill-wells encounter this formation at around 3750 feet in depth and other drill-wells at around 5000 feet in depth. In turn, and as described in relation to FIG. 4C below, the formation-top modeling system 104 can utilize this drill-well data to generate formation-top trends (e.g., by estimating a variogram of formation-top depths).

Figure 4C:
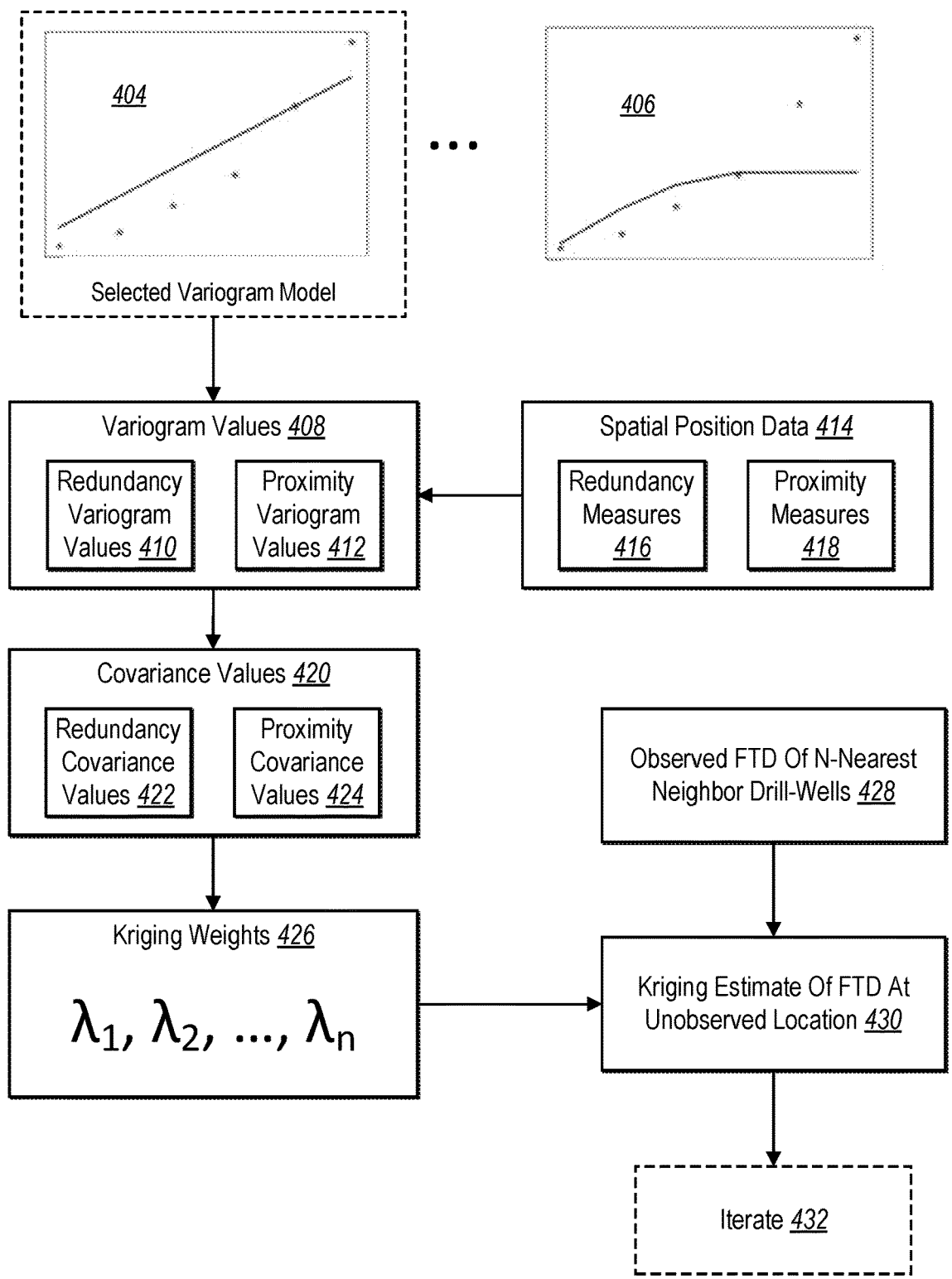
FIG. 4C illustrates a formation-top modeling system utilizing variogram modeling to generate formation-top trends in accordance with one or more embodiments.

FIG. 4C illustrates the formation-top modeling system 104 utilizing variogram modeling to generate formation-top trends in accordance with one or more embodiments. As shown, the formation-top modeling system 104 can generate, for example, a variogram 404 and a variogram 406. Based on the selected variogram model and spatial position data 414, the formation-top modeling system 104 can generate variogram values 408. In turn, the formation-top modeling system 104 can utilize the variogram values 408 and the selected variogram model to generate covariance values 420. From the covariance values 420, the formation-top modeling system 104 can generate Kriging weights 426 that, when combined with observed formation-top depths of the n-nearest neighbor drill-wells, generate a Kriging estimate of a formation-top depth at an unobserved location (such as the subject drill-well site). The formation-top modeling system 104 can then iterate for additional formations at the unobserved location and/or iterate for other unobserved locations to generate the formation-top trends (including formation-top depths for the subject drill-well site).

As just mentioned, the formation-top modeling system 104 can generate the variograms 404 and 406. Both the variograms 404 and 406 indicate variance in formation-top depth as a function of distance between observed drill-wells (e.g., for a subset of drill-wells within a threshold geographic area). In particular, the formation-top modeling system 104 in some embodiments fits a linear model to the variance data depicted in the variogram 404. Additionally, in some implementations, the formation-top modeling system 104 fits a spherical model to the same variance data depicted in the variogram 406. In these or other embodiments, the formation-top modeling system 104 may utilize additional or alternative variogram models depending on the dataset of observed formation-top depths (e.g., circular, exponential, Gaussian, penta-spherical, power function, etc.). With the modeled variance data, the formation-top modeling system 104 can compare how well the respective models fit the variance data (e.g., utilizing an R-squared value or other suitable statistic value). Based on the best-fitting model (e.g., the variogram model associated with the highest R-squared value), the formation-top modeling system 104 can select that model for generating the variogram values 408.

To generate the variogram values 408 comprising redundancy variogram values 410 and proximity variogram values 412, the formation-top modeling system 104 applies an algorithm associated with the selected variogram model to the spatial position data 414. To do so, the formation-top modeling system 104 determines redundancy measures 416 and proximity measures 418 of the spatial position data 414. In particular, the formation-top modeling system 104 determines the redundancy measures 416 by identifying spatial relationships (i.e., distance relationships) between each of the observed drill-wells in the subset of drill-wells of the threshold geographic area. For instance, given drill-well locations A, B, and C of observed drill-wells, the formation-top modeling system 104 can generate the redundancy measures 416 reflecting distance values between respective permutations of drill-well locations A, B, and C (i.e., distance values for AA, AB, AC, BA, BB, BC, CA, CB, and CC). In this case, the distance values AA, BB, and CC would be zero. As such, the formation-top modeling system 104 can account for data redundancy (i.e., observed drill-wells that are relatively close to each other and are therefore more redundant than other observed drill-wells that are spread farther apart). Moreover, as will be described more below, the formation-top modeling system 104 associates a smaller Kriging weight with more redundant data.

Similarly, the formation-top modeling system 104 can determine the proximity measures 418 by identifying spatial relationships between an unobserved (subject) location and each of the observed drill-wells in the subset of drill-wells of the threshold geographic area. For instance, given the above example drill-well locations A, B, and C, the formation-top modeling system 104 can generate the proximity measures 418 reflecting distance values between respective combinations of an unobserved drill-well location X and drill-well locations A, B, and C (i.e., distance values for AX, BX, and CX). In so doing, the formation-top modeling system 104 can account for spatial proximity of the locations for the observed drill-wells to the unobserved drill-well location. Moreover, as will be described more below, the formation-top modeling system 104 assigns smaller Kriging weights for locations of observed drill-wells farther away from the unobserved location, and larger Kriging weights for locations of observed drill-wells closer to the unobserved location.

After generating the redundancy measures 416, the formation-top modeling system 104 can apply the algorithm associated with the selected variogram model to the redundancy measures 416 to generate the redundancy variogram values 410. For example, given a selected spherical variogram model, the formation-top modeling system 104 would use the following spherical variogram expression to generate the redundancy variogram values 410:

$$\gamma(h) = \begin{cases} \frac{1.5\,h}{\alpha} - .5\left(\frac{h}{\alpha}\right)^3, & h \leq \alpha, \\ 1, & h > \alpha \end{cases}$$

where $$\alpha = \gamma(\text{sill})$$

Specifically, in some implementations, the formation-top modeling system 104 generates the redundancy variogram values 410 comprising a variance value for each of the redundancy measures 416 (e.g., variance values when h in the variogram model algorithm is respectively substituted for the distance values AA, AB, AC, BA, BB, BC, CA, CB, and CC). In this case, as with the distance values, the variance values of the redundancy variogram values 410 for AA, BB, and CC would be zero.

Additionally, after generating the proximity measures 418, the formation-top modeling system 104 can apply the variogram model algorithm to the proximity measures 418 to generate the proximity variogram values 412. Similar to the redundancy variogram values 410, the formation-top modeling system 104 can generate the proximity variogram values 412 comprising a variance value for each of the proximity measures 418 (e.g., variance values when h in the variogram model algorithm is respectively substituted for the distance values AX, BX, and CX).

Utilizing the selected variogram model with the redundancy variogram values 410 and the proximity variogram values 412, the formation-top modeling system 104 can generate redundancy covariance values 422 and proximity covariance values 424, respectively, of the covariance values 420. To do so, the formation-top modeling system 104 can subtract the variogram values 408 from the global variance (e.g., the sum value of the nugget and the sill) identified according to the selected variogram model. Accordingly, the formation-top modeling system 104 can generate the redundancy covariance values 422 by subtracting the redundancy variogram values 410 from the global variance indicated via the selected variogram model. Similarly, the formation-top modeling system 104 can generate the proximity covariance values 424 by subtracting the proximity variogram values 412 from the global variance indicated via the selected variogram model. In so doing, the formation-top modeling system 104 continues to account for redundancy between the observed drill-wells in addition to accounting for closeness of the observed drill-wells to the unobserved location. Thus, in some embodiments, the redundancy covariance values 422 comprises a first set of formation-top-depth covariances between the respective positions of the subset of drill-wells in the threshold geographic area. Likewise, in some implementations, the proximity covariance values 424 comprises a second set of formation-top-depth covariances between the unobserved location (e.g., the subject drill-well site) and the respective positions of the subset of drill-wells in the threshold geographic area.

From the covariance values 420, the formation-top modeling system 104 can generate the kriging weights 426. To do so, the formation-top modeling system 104 can apply a modified version of the redundancy covariance values 422 to the proximity covariance values 424. Specifically, for example, the formation-top modeling system 104 can invert a matrix comprising the redundancy covariance values 422, and apply the inverse matrix to the proximity covariance values 424 in order to solve for the kriging weights 426 according to the following example expression:

$$\begin{bmatrix} C(u_A, u_A) & C(u_A, u_B) & C(u_A, u_C) \\ C(u_B, u_A) & C(u_B, u_B) & C(u_B, u_C) \\ C(u_C, u_A) & C(u_C, u_B) & C(u_A, u_C) \end{bmatrix} \begin{bmatrix} \lambda_A \\ \lambda_B \\ \lambda_C \end{bmatrix} = \begin{bmatrix} C(u_X, u_A) \\ C(u_X, u_B) \\ C(u_X, u_C) \end{bmatrix}$$

wherein (left-to-right) the first matrix represents an example of the redundancy covariance values 422, the second matrix represents an example of three Kriging weights 426 to be solved for, and the third matrix represents the proximity covariance values 424. In other terms, the formation-top modeling system 104 solves a system of n-equations with n-kriging weights.

With the kriging weights 426, the formation-top modeling system 104 can then generate a Kriging estimate 430 of a formation-top depth at the unobserved location in the threshold geographic area. To do so, for example, the formation-top modeling system 104 may determine a weighted combination of the formation-top depths for the subset of drill-wells in the threshold geographic area. That is, the formation-top modeling system 104 can generate the Kriging estimate 430 by applying the Kriging weights 426 to the observed formation-top depths 428 of n-nearest neighbor drill-wells according to the following example expression:

$$\hat{Y}(x) = \sum_{i=1}^{N} \lambda_i y(x_i),$$

where the term $\hat{Y}(x)$ represents the Kriging estimate 430 of a formation-top depth at the unobserved location, and the term $\lambda_i$ represents the respective Kriging weights 426 for correspondingly applying to the i-th formation-top depth of the subset of drill-wells in the threshold geographic area represented by the term $y(x_i)$. In some implementations, depending on the type of Kriging method, applying the Kriging weights 426 to the observed formation-top depths 428 of n-nearest neighbor drill-wells comprises applying the Kriging weights 426 to residual values (e.g., an individual formation-top depth value minus a global formation-top depth mean) instead of the formation-top depth values alone.

In turn, the formation-top modeling system 104 can perform one or more iterations 432 of the foregoing acts and algorithms (e.g., for additional formations at the unobserved location and/or iterate for other unobserved locations) to thereby generate the formation-top trends. In some implementations, the formation-top modeling system 104 may perform the one or more iterations 432 until a sufficient number of Kriging estimates are generated in order to map the formation-top trends across the threshold geographic area with a threshold confidence/accuracy score. Additionally or alternatively, the formation-top modeling system 104 may perform the one more iterations 432 until a number of generated Kriging estimates 430 satisfies a predetermined ratio of observed formation-top depths to Kriging estimates 430 of formation-top depths. Other suitable adjustments, additions, and/or alterations to the foregoing acts and algorithms are herein contemplated.

For example, the formation-top modeling system 104 may implement one or more acts and algorithms according to various types of Kriging methods to generate the formation-top trends as disclosed herein. Such Kriging methods may include, for instance, ordinary Kriging, simple Kriging, universal Kriging, disjunctive Kriging, indicator Kriging, and the like as described in Kriging, by ScienceDirect, archived at https://www.sciencedirect.com/topics/earth-and-planetary-sciences/kriging, the contents of which are expressly incorporated herein by reference.

Additionally or alternatively to Kriging methods, the formation-top modeling system 104 may implement other suitable acts and algorithms for generating the formation-top trends for the threshold geographic area. For example, the formation-top modeling system 104 may implement a linear estimator, a sequential Gaussian simulation, indicator simulation, multi-point statistics, inverse distance weighting, multi-dimensional interpolation, etc.

Figure 4D:
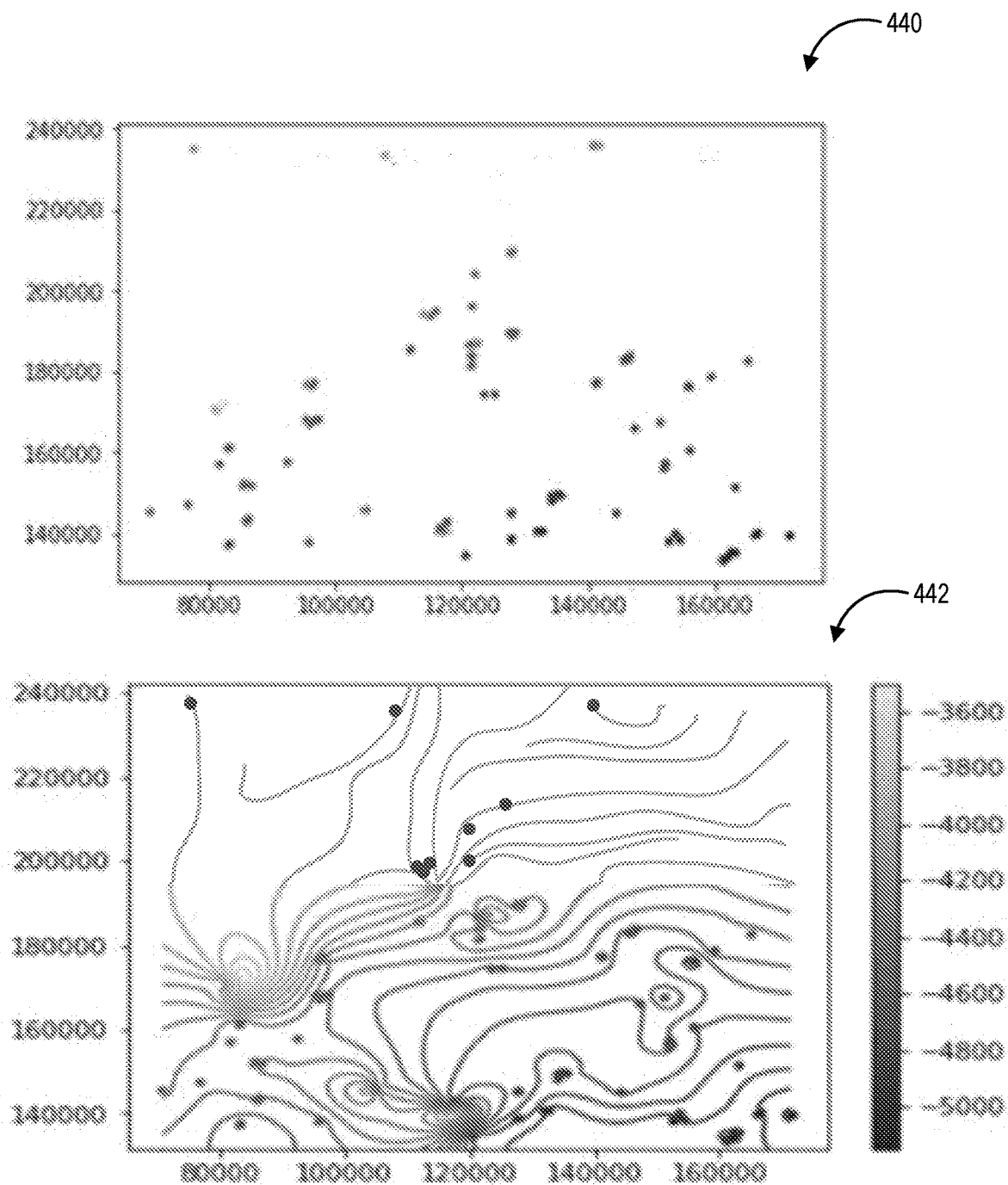
FIGS. 4D-4G illustrate a formation-top modeling system mapping formation-top trends in accordance with one or more embodiments.
Figure 4E:
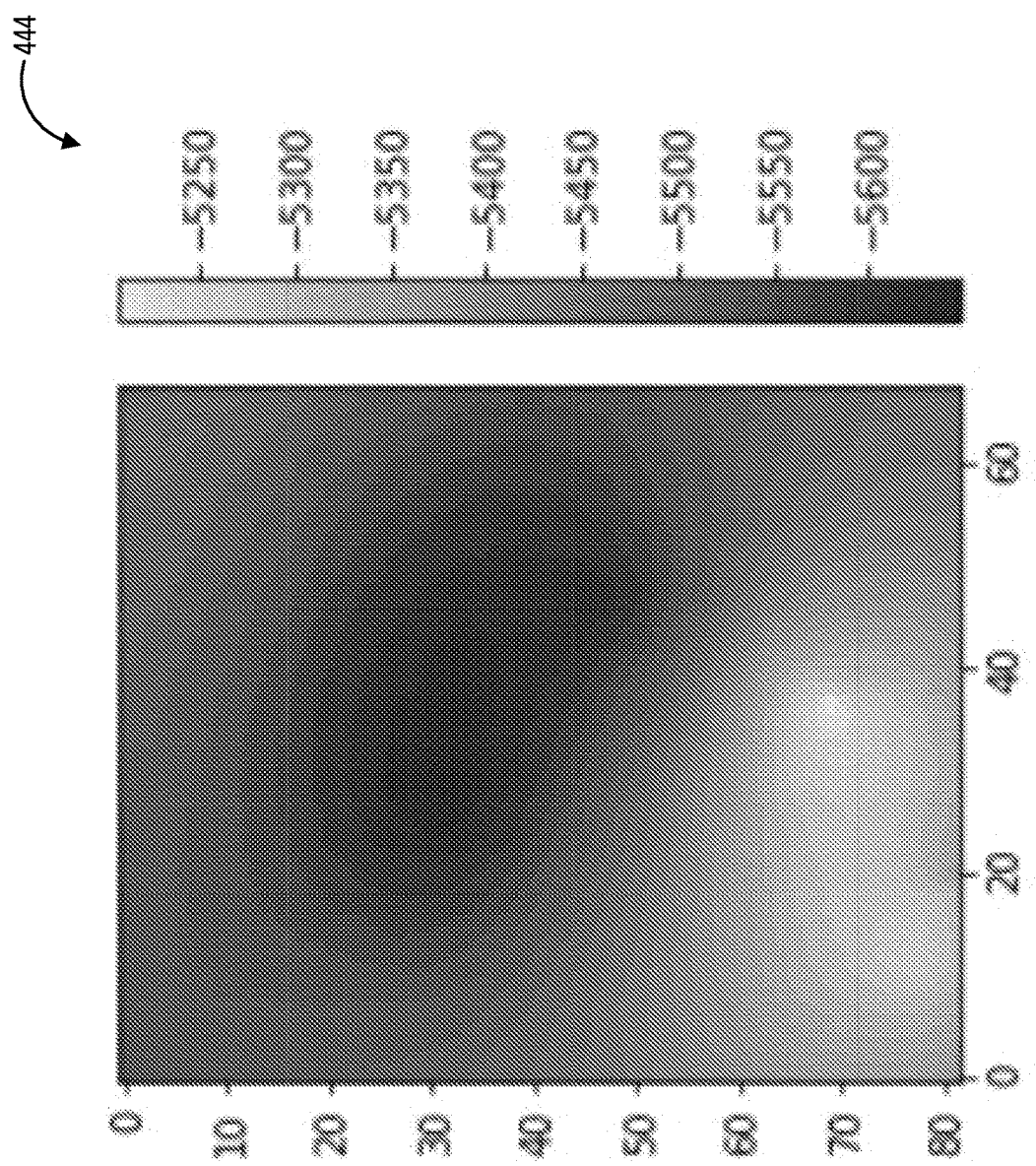

As mentioned above, the formation-top modeling system 104 can map the response (e.g., formation-top depths) across the threshold geographic area. FIGS. 4D-4G therefore illustrate the formation-top modeling system 104 mapping formation-top trends in accordance with one or more embodiments. As shown in a chart 440 of FIG. 4D, the formation-top modeling system 104 can map formation-top depths for a subset of drill-wells in a threshold geographic area. However, to generate the formation-top trends across a threshold geographic area as shown for example in charts 442 and 444 of FIGS. 4D and 4E, the formation-top modeling system 104 can apply Kriging weights to formation-top depths (as discussed above in relation to FIG. 4C) to estimate formation-top depths at unobserved locations. In particular, the chart 442 of FIG. 4D illustrates the formation-top modeling system 104 utilizing a contour mapping with line-based gradients to indicate the estimated formation-top depths across the threshold geographic area. In contrast, the chart 444 of FIG. 4E illustrates the formation-top modeling system 104 utilizing a color mapping with pixel-value based gradients to indicate the estimated formation-top depths across the threshold geographic area. In these or other embodiments, other suitable mappings are herein contemplated.

Figure 4F:
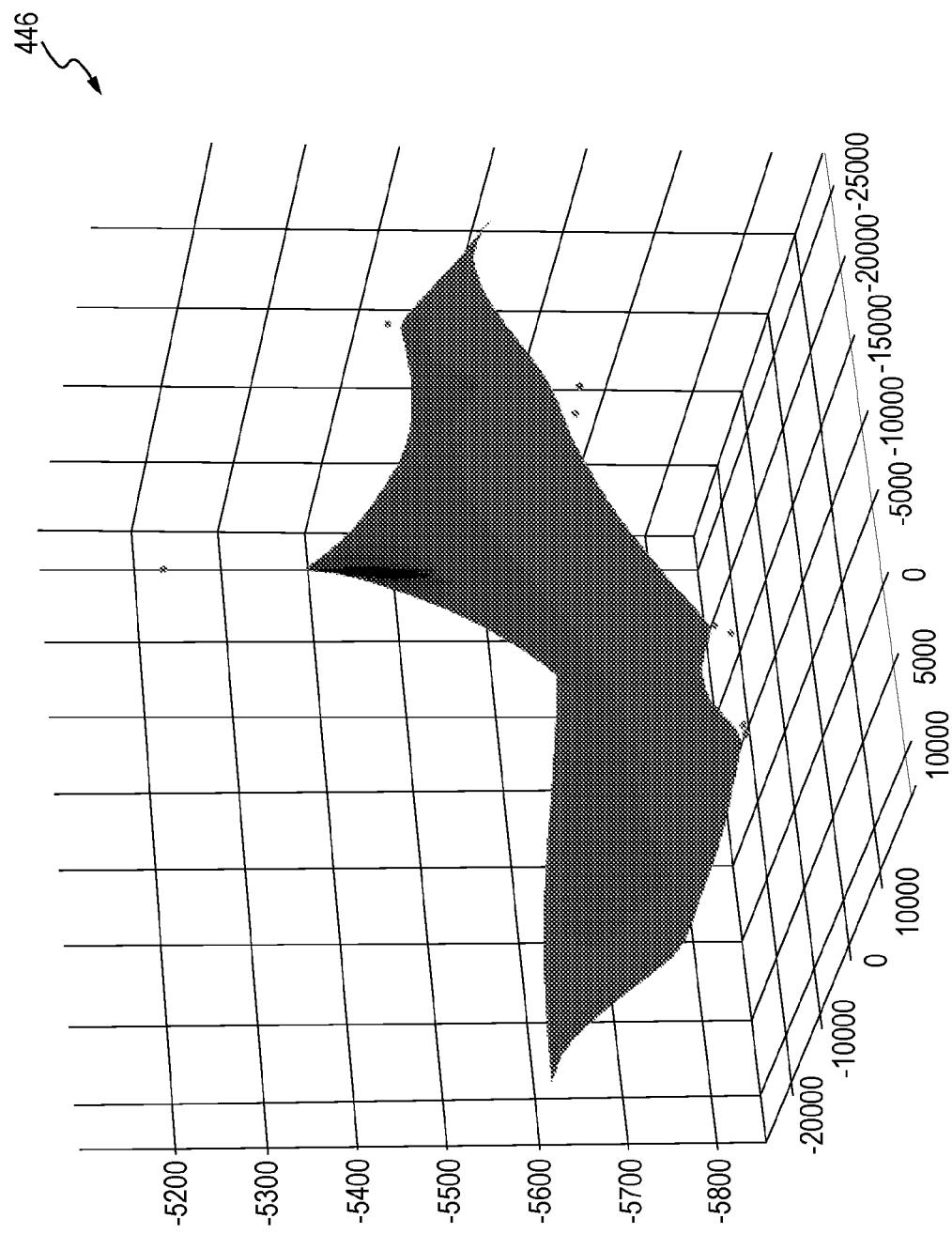
Figure 4G:
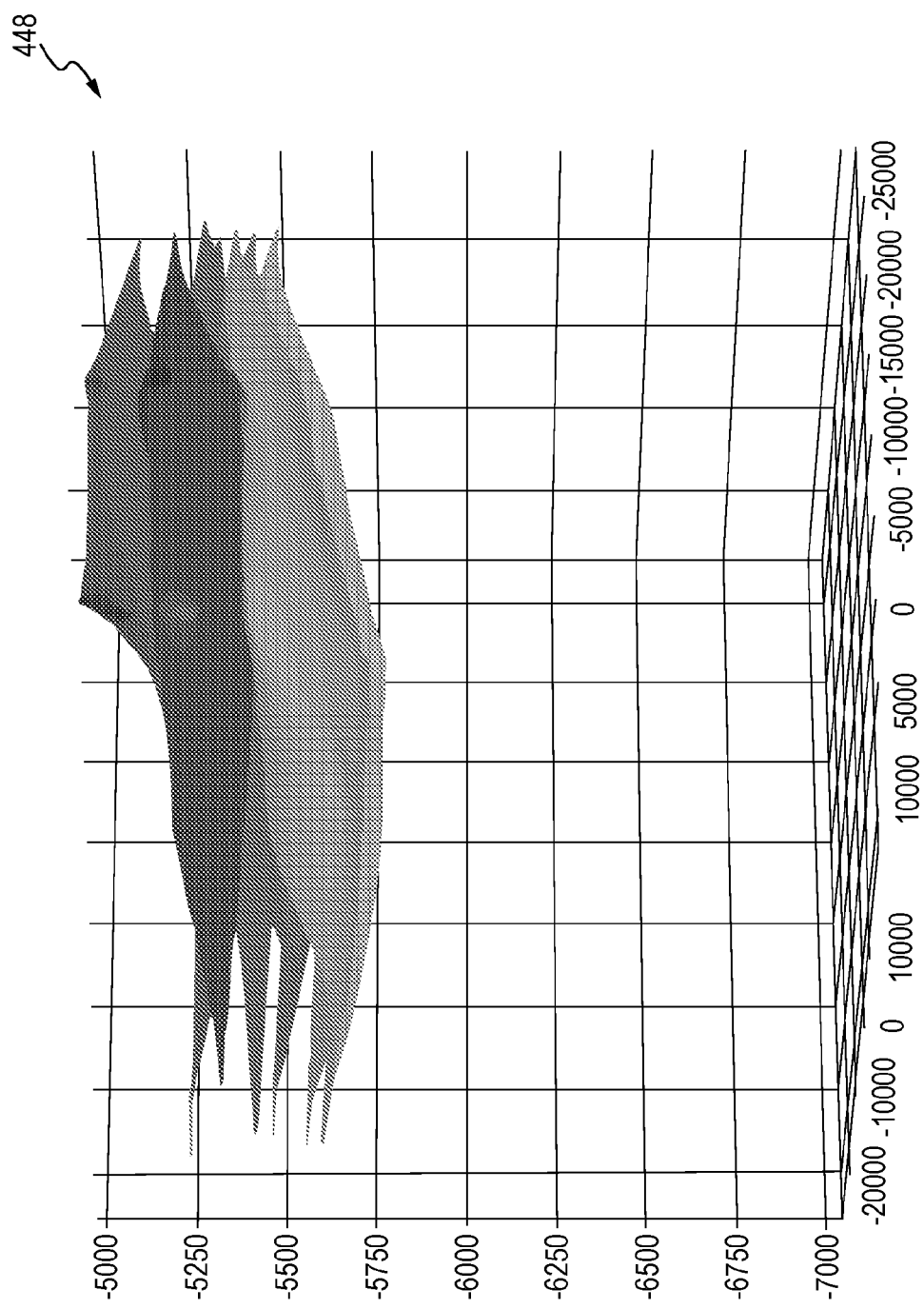

Additionally or alternatively to contour mappings or color mappings indicating formation-top trends, the formation-top modeling system 104 can also map continuous surfaces for the formation-top trends. For example, as shown in FIGS. 4F-4G, the formation-top modeling system 104 can map a continuous subterranean surface of a formation between respective positions of the subset of drill-wells in a threshold geographic area. In particular, the formation-top modeling system 104 can isolate individual formations as shown in chart 446 of FIG. 4F, or map multiple (e.g., all) formations across the threshold geographic area as shown in chart 448 of FIG. 4G.

Albeit mapping the formation-top trends is not required to determine formation-top depths at a subject drill-well site, the formation-top modeling system 104 can nevertheless use the formation-top trends as illustrated in FIGS. 4D-4G to determine the formation-top depths at the subject drill-well site. For example, in some implementations, the formation-top modeling system 104 can compare the location of the subject drill-well site with the mapped response of the formation-top trends across the threshold geographic area to identify the formation-top depths at the location of the subject drill-well site indicated in the mapped response. In certain embodiments, the formation-top modeling system 104 identifies a depth for at least one of the continuous subterranean surfaces of a formation corresponding to the location of the subject drill-well site.

As mentioned above, the formation-top modeling system 104 can selectively identify drill-wells and generate formation-top depths in a user-friendly and resource-efficient manner. FIGS. 5A-5B therefore illustrate user interfaces 502a-502b on a computing device 500 for initiating formation-top depth generation in accordance with one or more embodiments. As shown in FIG. 5A, the formation-top modeling system 104 provides, for display within the user interface 502a, a map portion 503, a location pin-drop 504, a location search bar 506, and an execution element 508. Further, and as will be demonstrated in the following embodiments, the formation-top modeling system 104 facilitates intuitive selection of a subject drill-well site via a simplified, yet powerful digital user interface configured to initiate formation-top depth generation as disclosed herein.

In particular, the user interface 502a is configured to receive one or more user interactions to identify a location of a subject drill-well site. In some implementations, the formation-top modeling system 104 provides, for display within the user interface 502a, the location pin-drop 504 as a selectable input element subject to various haptic inputs (e.g., a touch/tap user input, a drag-and-drop user input, etc.). For example, the formation-top modeling system 104 can, in response to a user interaction with the location pin-drop 504, cause the location pin-drop 504 to move in accordance with a user interaction (e.g., slidably move across the user interface 502a as a touch-and-drag user input takes place). In yet another example, the formation-top modeling system 104 may activate the location pin-drop 504 in response to a touch, long-press, or tap. In turn, the formation-top modeling system 104 may activate the map portion 503. Thus, in response to a second user interaction, this time with the map portion 503, the formation-top modeling system 104 may automatically move the location pin-drop 504 to a location in the map portion 503 that received the second user interaction. Alternatively, the formation-top modeling system 104 may maintain the map portion 503 in an active state such that, in response to a single user input to the map portion 503, the formation-top modeling system 104 can cause the location pin-drop 504 to automatically move to a corresponding location in the map portion 503. In this case, no activation via the location pin-drop 504 is needed.

As further shown in FIG. 5A, the formation-top modeling system 104 can provide, for display within the user interface 502a, the location search bar 506 and the execution element 508. In these or other embodiments, the location search bar is configured to receive alphanumeric location entries/queries (e.g., location coordinates) for the subject drill-well site. Then, in response to a user input at the execution element 508, the formation-top modeling system 104 can cause the location pin-drop 504 to automatically move to a corresponding location in the map portion 503.

Moreover, in response to identifying the location of the subject drill-well site (via whatever manner provided as just discussed), the system can initiate formation-top depth generation as disclosed herein. For example, as shown in FIG. 5B, the formation-top modeling system 104 causes the device 500 to provide, for display, the user interface 502b comprising the map portion 503, the location pin-drop 504, threshold geographic areas 510a-510b, and location coordinates 512. Specifically, as shown in FIG. 5B, the location pin-drop 504 is positioned within the map portion 503 at the location coordinates 512. In addition, the user interface 502b indicates the formation-top modeling system 104 is searching for pre-existing neighbor drill-wells (i.e., a subset of drill-wells) positioned within at least one of the threshold geographic areas 510a-510b. For example, as described in relation to the foregoing figures, the formation-top modeling system 104 can select the threshold geographic area 510a or the threshold geographic area 510b depending on whether the respective geographic areas include a threshold number of drill-wells for generating formation-top trends therebetween. Additionally or alternatively, the threshold geographic areas 510a-510b may be configured for user selection. Then, utilizing the subset of drill-wells identified within the threshold geographic areas 510a/510b, the formation-top modeling system 104 can determine formation-top depths at a subject drill-well site, for example, as shown in FIG. 5C.

FIG. 5C illustrates a user interface 502c on the computing device 500 for generating formation-top depths at a subject drill-well site in accordance with one or more embodiments. As shown in FIG. 5C, the formation-top modeling system 104 provides, for display within the user interface 502c, formations 518 and corresponding formation-top depths 520 for the location coordinates 512 of a subject drill-well site. In addition, and consistent with at least one of the threshold geographic areas 510a-510b of FIG. 5B, the formation-top modeling system 104 returns a search radius 514 of a ten-mile radius comprising a well-count 516 of one hundred six observed drill-wells. Moreover the formation-top modeling system 104 provides, for display within the user interface 502c, a number of selectable input elements 522-532 for interacting with the generated data (in particular, the formations 518 and the formation-top depths 520) in an intuitive, user-friendly manner.

Figure 7:
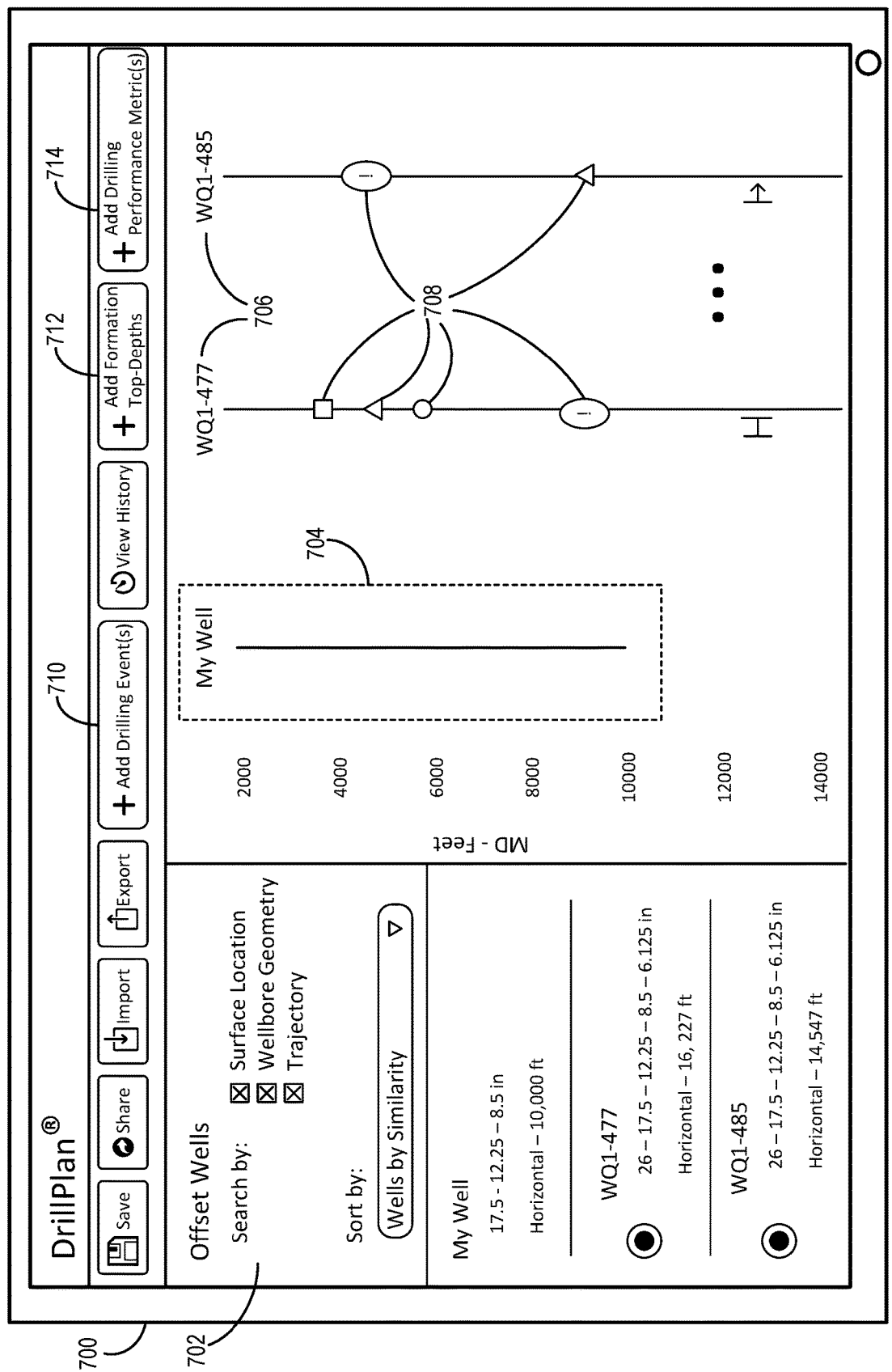
FIG. 7 illustrates a user interface on a computing device for utilizing data of a subject drill-well in accordance with one or more embodiments.

For example, in response to receiving an indication of a user interaction with the selectable input element 522, the formation-top modeling system 104 can export the formations 518 and the formation-top depths 520 for the subject drill-well site to another software application, such as DRILLPLAN® (e.g., to manage drilling exploration and production metrics for multiple drill-wells) as described in more detail below in relation to FIG. 7. Additionally or alternatively, in response to receiving an indication of a user interaction with the selectable input element 522, the formation-top modeling system 104 can export the formations 518 and the formation-top depths 520 to a third-party server, share via a BlueTooth® connection, email, print, and the like.

Similarly, in response to receiving an indication of a user interaction with the selectable input element 524, the formation-top modeling system 104 can change the search radius 514. For example, the formation-top modeling system 104 may cause the user interface 502c to present a pop-up window requesting user input to increase or decrease the search radius 514, increase or decrease the well-count 516 to a desired number, etc. In so doing, the formation-top modeling system 104 can modify the threshold geographic area 510a, 510b accordingly and identify a new subset of drill-wells positioned therein to extract drill-well data and generate formation-top trends as described in relation to the foregoing figures.

Additionally, in response to receiving an indication of a user interaction with the selectable input element 526, the formation-top modeling system 104 can cause the user interface 502c to present expected drilling performance metrics associated with drilling through the formations 518 at the formation-top depths 520 for the subject drill-well site. For instance, and as described in more detail below in relation to FIGS. 6B-6C, the formation-top modeling system 104 may cause the user interface 502c to display previously observed drilling performance metrics for one or more of the formations 518. Additionally or alternatively, the formation-top modeling system 104 may cause the user interface 502c to display predicted drilling performance metrics for drilling through the formations 518 at the formation-top depths 520 given certain drilling parameters and/or a BHA selection.

Likewise, in response to receiving an indication of a user interaction with the selectable input element 528, the formation-top modeling system 104 can cause the user interface 502c to present expected drilling events associated with drilling through the formations 518 at the formation-top depths 520 for the subject drill-well site. For example, and as described in more detail below in relation to FIGS. 6A and 6C, the formation-top modeling system 104 may cause the user interface 502c to display previously observed drilling events for one or more of the formations 518. Additionally or alternatively, the formation-top modeling system 104 may cause the user interface 502c to display predicted drilling events for drilling through the formations 518 at the formation-top depths 520 given certain drilling parameters and/or a BHA selection.

Further, in response to receiving an indication of a user interaction with the selectable input element 530, the formation-top modeling system 104 can cause the user interface 502c to optimize drilling parameters for drilling through the formations 518 at the formation-top depths 520 of the subject drill-well site. For instance, and as described in more detail below in relation to FIG. 6C, the formation-top modeling system 104 may cause the user interface 502c to display configurable drilling parameters set to increase a drilling performance metric, reduce a likelihood of a drilling event, and/or lower a cost metric.

Similarly, in response to receiving an indication of a user interaction with the selectable input element 532, the formation-top modeling system 104 can cause the user interface 502c to compare expected drilling performance metrics and/or expected drilling events by BHA selection. For example, and as described more below in relation to FIGS. 6A-6B, the formation-top modeling system 104 can cause the user interface 502c to display observed drilling performance metrics and/or observed drilling events as a function of drilling formation and according to a variety of different BHA types (e.g., vortex, rotary steerable, steerable motor, etc.).

As mentioned above, the formation-top modeling system 104 can provide, for display at a user interface of a client device, intuitive, visual analyses regarding data for drilling through formations predicted at a subject drill-well site. FIGS. 6A-6B therefore illustrate user interfaces 602a-602b on a computing device 600 for respectively depicting at least one observed drilling event and observed drilling performance metric in accordance with one or more embodiments. As shown in FIG. 6A, the formation-top modeling system 104 provides, for display within the user interface 602a, observed drilling events associated with a selectable formation 604 (e.g., the "Rustler" formation). In response to an indication of a user selection of a drop-down menu icon 606, the formation-top modeling system 104 can cause the computing device 600 to display within the user interface 602a a menu of the selectable formations available for individual selection (e.g., each formation predicted at the subject drill-well site). In the event the formation-top modeling system 104 receives an indication of a user selection of another selectable formation 604 in the menu (e.g., the Rhinestreet formation), the formation-top modeling system 104 can modify the user interface 602a accordingly. For example, the formation-top modeling system 104 may cause the computing device 600 to display the user interface 602a with observed drilling events for the Rhinestreet formation.

In more detail, the user interface 602a comprises a count chart of drilling events experienced in the selectable formation 604 for a subset of drill-wells in a threshold geographic area. More specifically, the user interface 602a details the drilling events that the formation-top modeling system 104 identified for the selectable formation 604 (in this example, the Rustler formation) by BHA type for the subset of drill-wells. For instance, given the observed drilling events of measurement while drilling (MWD), lost circulation, surface waiting, and mud motor/rotary steerable systems failure, the formation-top modeling system 104 identified specific instances of these drilling events involving the BHA types vortex, rotary steerable, and steerable motor. Indeed, the user interface 602a indicates two events of MWD failure in the Rustler formation when the vortex BHA was used and one event of MWD failure in the Rustler formation when the rotary steerable BHA was used. The user interface 602a further indicates one event of lost circulation, two events of surface waiting, and two events of mud motor/rotary steerable systems failure when using the rotary steerable BHA. In addition, the user interface 602a indicates one event for the vortex BHA and five events for the steerable motor BHA that involve mud motor/rotary steerable systems failure. Thus, utilizing the user interface 602a, the formation-top modeling system 104 can visually indicate that the rotary steerable BHA is generally problematic for the Rustler formation and that the steerable motor BHA struggles specifically with mud motor/rotary steerable systems failure in the Rustler formation. This intuitive presentation can, in turn, significantly reduce a number of user interactions to otherwise determine such a relationship between BHAs and drilling events for a given formation.

Figure 6A:
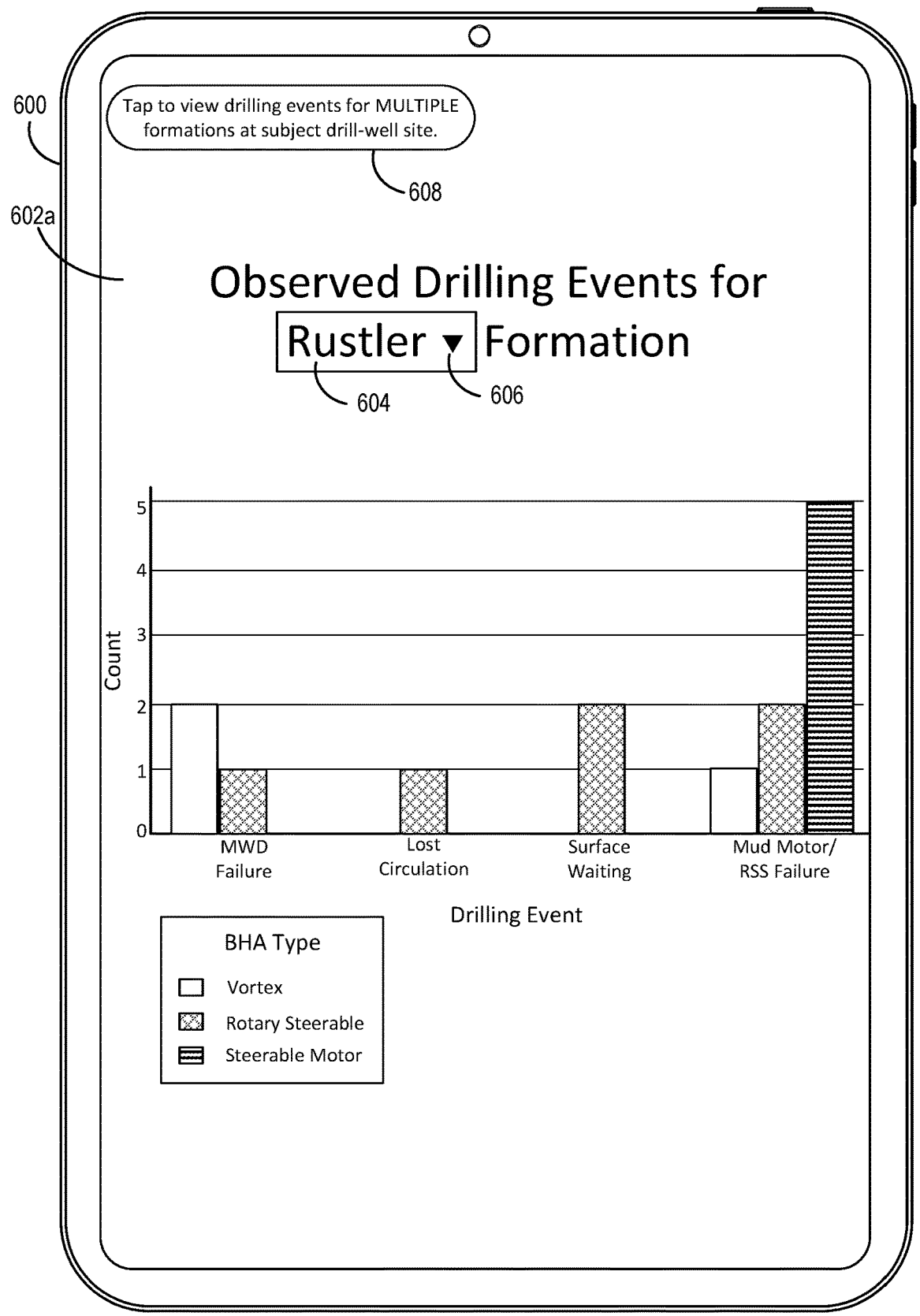
FIGS. 6A-6B illustrate user interfaces on a computing device for respectively depicting an observed drilling event and an observed drilling performance metric in accordance with one or more embodiments.

As further shown in FIG. 6A, the user interface 602a comprises an input element 608 that, in response to a user selection, causes the formation-top modeling system 104 to provide observed drilling events for multiple formations predicted at the subject drill-well site. In so doing, the formation-top modeling system 104 can, for discrete drilling sections of several formations, or all formations, visually indicate what BHA type (if used) will likely result in the fewest number of drilling events when drilling through the same formations at the subject drill-well site. Again, this intuitive presentation can allow a user to, at the tap of the user interface 602a, easily navigate to data that other systems do not provide in a single user interface, or in some cases, even a single software application.

Figure 6B:
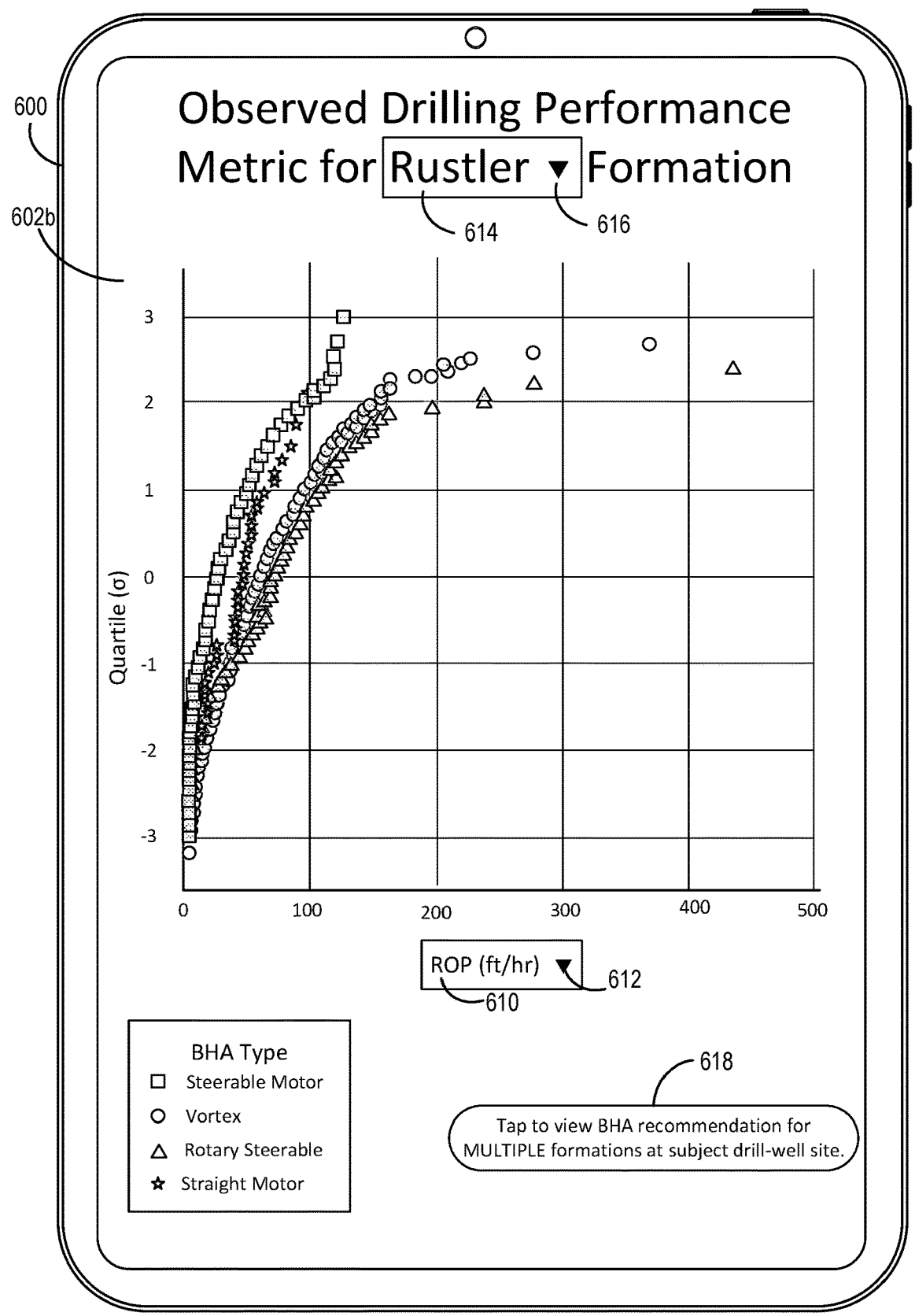

With respect to FIG. 6B, the formation-top modeling system 104 provides, for display within the user interface 602b, observed drilling metric(s) associated with a selectable formation 614 (e.g., the "Rustler" formation). As described above in relation to FIG. 6A, the formation-top modeling system 104 can cause the computing device 600 to display within the user interface 602b a menu of the selectable formations available for individual selection (e.g., each formation predicted at the subject drill-well site). For example, in response to an indication of a user selection of a drop-down menu icon 616, the formation-top modeling system 104 can present the menu of selectable formations and modify the user interface 602b in accordance with a selected formation (e.g., the Rhinestreet formation). For instance, the formation-top modeling system 104 may cause the computing device 600 to display the user interface 602b with observed drilling performance metric(s) for the Rhinestreet formation. Similarly, the formation-top modeling system 104 can cause the computing device 600 to display within the user interface 602b a menu of selectable drilling performance metrics available for individual selection. For example, in response to an indication of a user selection of a drop-down menu icon 612, the formation-top modeling system 104 can present the menu of selectable drilling performance metrics and modify the user interface 602b in accordance with a selected drilling performance metric (e.g., the Rhinestreet formation).

In more detail, the user interface 602b comprises distribution data (by standard deviation a) of a drilling performance metric experienced in the selectable formation 614 for a subset of drill-wells in a threshold geographic area. More specifically, the user interface 602b details the selectable drilling performance metric 610 that the formation-top modeling system 104 identified for the selectable formation 614 (in this example, the Rustler formation) by BHA type for the subset of drill-wells. For instance, given the selectable drilling performance metric 610 (in this example, the rate of penetration "ROP"), the formation-top modeling system 104 identified ROP data for the BHA types steerable motor, vortex, rotary steerable, and straight motor. Indeed, the user interface 602b indicates, by way of example, an ROP for the steerable motor BHA of about 15 ft/hr to about 100 ft/hr for +/−2 standard deviations (with a mean value of about 35 ft/hr). In addition, for instance, the user interface 602b indicates an ROP for the rotary steerable BHA of about 20 ft/hr to about 200 ft/hr for +/−2 standard deviations (with a mean value of about 75 ft/hr). Thus, utilizing the user interface 602b, the formation-top modeling system 104 can visually indicate that the rotary steerable BHA provides superior ROP performance in the Rustler formation. This intuitive presentation can, in turn, significantly reduce a number of user interactions to otherwise determine such a relationship between BHAs and ROP for a given formation.

As further shown in FIG. 6B, the user interface 602b comprises an input element 618 that, in response to a user selection, causes the formation-top modeling system 104 to provide observed drilling performance metric(s) for multiple formations predicted at the subject drill-well site. In so doing, the formation-top modeling system 104 can, for discrete drilling sections of several formations, or all formations, visually indicate what BHA type (if used) will likely attain a particular drilling performance metric when drilling through the same formations at the subject drill-well site. Again, like in FIG. 6A, this intuitive presentation can allow a user to, at the tap of the user interface 602b, easily navigate to data that other systems do not provide in a single user interface, or in some cases, even a single software application.

Figure 6C:
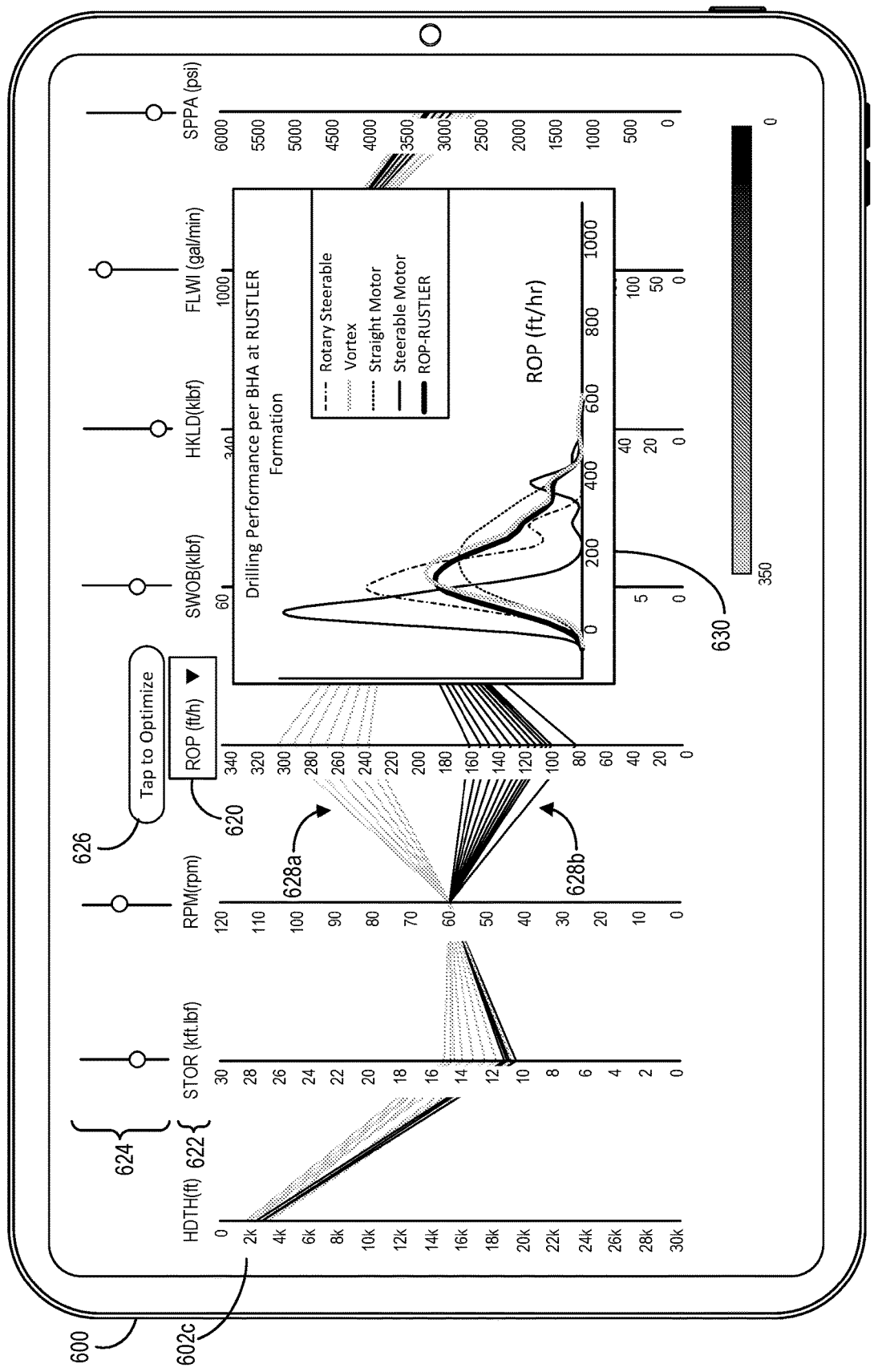
FIG. 6C illustrates a user interface on a computing device for modifying drilling parameters to optimize a predicted drilling performance metric in accordance with one or more embodiments.

As mentioned above, the formation-top modeling system 104 can optimize drilling parameters and/or determine a bottom-hole assembly (BHA) to increase a predicted drilling performance metric, reduce a likelihood of a predicted drilling event, lower a cost metric, etc. Additionally or alternatively, the formation-top modeling system 104 in some implementations provides a user-friendly interface to easily modify and intuitively visualize how modifying drilling parameters affects a predicted drilling performance metric and/or a predicted drilling event at the subject drill-well site. FIG. 6C therefore illustrates a user interface 602c on a computing device 600 for modifying drilling parameters to optimize a predicted drilling performance metric in accordance with one or more embodiments.

As shown in FIG. 6C, the formation-top modeling system 104 provides, for display within the user interface 602c, drilling parameters 622 for modifying a selectable drilling performance metric 620 (i.e., a predicted drilling performance metric for drilling at the subject drill-well site). In these or other embodiments, the formation-top modeling system 104 can generate the drilling parameters 622 based on drilling parameters for observed drill-wells (e.g., parameters W and X for Y formation that generated Z performance). That is, the formation-top modeling system 104 can utilize observed relationships between implemented drilling parameters and observed drilling events, drilling performance metrics, etc. to provide and/or modify the drilling parameters 622 as predicted for the subject drill-well site.

To facilitate modification of the drilling parameters 622, the formation-top modeling system 104 causes the computing device 600 to display, within the user interface 602c, various options for a user to do so. In some implementations, for instance, the formation-top modeling system 104 provides, for display within the user interface 602c, controls 624 for respectively adjusting the drilling parameters 622. For example, in response to a user interaction to slidably adjust one of the controls 624, the formation-top modeling system 104 can cause that corresponding control 624 of the user interface 602c to move in accordance with the user interaction (e.g., slide up or down). In so doing, the formation-top modeling system 104 can modify, in real time, the user interface 602c for display.

Additionally for example, in response to a user interaction with one of the controls 624 for the drilling parameter RPM, the formation-top modeling system 104 can apply a corresponding modification to the RPM drilling parameter by shifting the RPMs denoted at 60 revolutions per minute to a different value (e.g., a higher or lower value than 60 revolutions per minute). In turn, the formation-top modeling system 104 can also modify a charted value for the selectable drilling performance metric 620 affected by the modification to the RPM. For instance, simultaneously (or near simultaneously) to the user interaction to adjust one of the controls 624, the formation-top modeling system 104 can cause the computing device 600 to display, within the user interface 602c, one or more modified ROP values responsive to the modification to adjust one of the controls 624. As an example, the formation-top modeling system 104 may cause one or more of the data sets 628a-628b to shift ROP values in accordance with the user interaction to move one of the controls 624 for the drilling parameter RPM. In these or other embodiments, the data set 628a may correspond to a first BHA type (e.g., the vortex BHA), while the data set 628b may correspond to a second BHA type (e.g., the steerable motor BHA). Additionally or alternatively, while only two data sets 628a-628b are illustrated for clarity, the user interface 602c may include more or fewer data sets as desired (e.g., for each BHA type).

Accordingly, the formation-top modeling system 104 provides, within the user interface 602c, an intuitive, convenient way to customize drilling parameters. As another option to do so, the formation-top modeling system 104 provides, for display within the user interface 602c, an optimization element 626. In response to a user interaction with the optimization element 626, the formation-top modeling system 104 can automatically adjust one or more of the drilling parameters 622 to achieve an optimal value for the selectable drilling performance metric 620. For example, the formation-top modeling system 104 may determine a particular combination of values for the drilling parameters 622 that maximize ROP. In some cases, responsive to a user interaction with the optimization element 626, the formation-top modeling system 104 can provide, for display within the user interface 602c, one or more configurable optimization parameters (e.g., max/min values of the drilling parameters 622) that the formation-top modeling system 104 can consider in the optimization process. Further, although the user interface 602c indicates ROP as the selectable drilling performance metric 620, other drilling performance metrics, drilling events, cost metrics, etc. are optimizable and selectable (e.g., via a drop-down menu activated from the drop-down menu icon).

Additionally or alternatively, as shown in FIG. 6C, the user interface 602c can include a chart 630 to visually indicate (e.g., for further clarity of presentation and user comprehension), the selectable drilling performance metric 620 by BHA type in a given formation (e.g., the Rustler formation). For example, utilizing the chart 630, the formation-top modeling system 104 can visually indicate that the steerable BHA has relatively poor ROP in the Rustler formation in comparison to the straight motor BHA.

Further, in some embodiments, the user interface 602c comprises a different configuration and/or presentation of elements. For example, the user interface 602c may include different types of controls 624 than illustrated. Alternatively, the user interface 602c may omit the controls 624. In this case, the formation-top modeling system 104 may respond to user interactions directly with the data sets (lines) 628a-628b to modify the drilling parameters 622 (e.g., a user input to move a line in the data set 628a up or down).

Additionally or alternatively, in some embodiments, the formation-top modeling system 104 optimizes drilling parameters specific to other customizable drilling implementations (e.g., drill-bit selection, mud selection, polycrystalline diamond cutter (PDC) selection, and the like). For example, given a formation-top depth prediction for the Rustler formation at the subject drill-well site, the formation-top modeling system 104 can predict ROP data for the subject drill-well site. To do so for example, the formation-top modeling system 104 can base the ROP predictions for the subject drill-well site on observed relationships between implemented drilling parameters and ROP performance at the n-nearest neighbor drill-wells that utilized a specific drill-bit, mud formulation, or PDC configuration/composition. In this manner, the formation-top modeling system 104 can also illustrate and/or recommend other suitable drilling implementations for drilling through one or more formations at the subject drill-well site.

As mentioned above, the formation-top modeling system 104 can transmit, to another software application or third-party device, formation-top depths, predicted drilling performance metrics, and/or predicted drilling events for a subject drill-well site. As an example, the formation-top modeling system 104 can facilitate intuitive data export for a subject drill-well site to another software application, such as DRILLPLAN® (e.g., to manage drilling exploration and production metrics for multiple drill-wells). FIG. 7 therefore illustrates a user interface 702 on a computing device 700 for utilizing data of a subject drill-well in accordance with one or more embodiments.

As shown, the user interface 702 comprises column representations of a subject drill-well 704 in addition to column representations of one or more other drill-wells 706 (e.g., of a subset of drill-wells). As additionally illustrated, the user interface 702 can include drilling event indicators 708 associated with corresponding drilling events experienced at particular measured depths for the one or more other drill-wells 706. In like manner, the formation-top modeling system 104 can provide, for display within the user interface 702, graphical indicators of formation-top depths, predicted drilling performance metrics, and/or predicted drilling events for the subject drill-well 704.

To do so for example, the formation-top modeling system 104 can, in response to a user interaction with an input element 710, provide for display within the user interface 702 one or more drilling events associated with the subject drill-well 704. In these or other embodiments, the drilling events for the subject drill-well site may be predicted (pre-observation) or observed (post-observation) drilling events. Similarly, the formation-top modeling system 104 can, in response to a user interaction with an input element 712, provide for display within the user interface 702 one or more formation-top depths associated with the subject drill-well 704. Like the drilling events, the formation-top depths may be predicted (pre-observation) or observed (post-observation) formation-top depths. In addition, the formation-top modeling system 104 can, in response to a user interaction with an input element 714, provide for display within the user interface 702 one or more drilling performance metrics associated with the subject drill-well 704. These drilling performance metrics, like the drilling events and the formation-top depths, may be predicted (pre-observation) or observed (post-observation) drilling performance metrics. Additionally or alternatively, the user interface 702 may include a different arrangement of components and/or may have a different number or set of components altogether to intuitively access, store, transmit, etc. drill-well data for multiple drill-wells, including the subject drill-well 704.

Figure 8A:
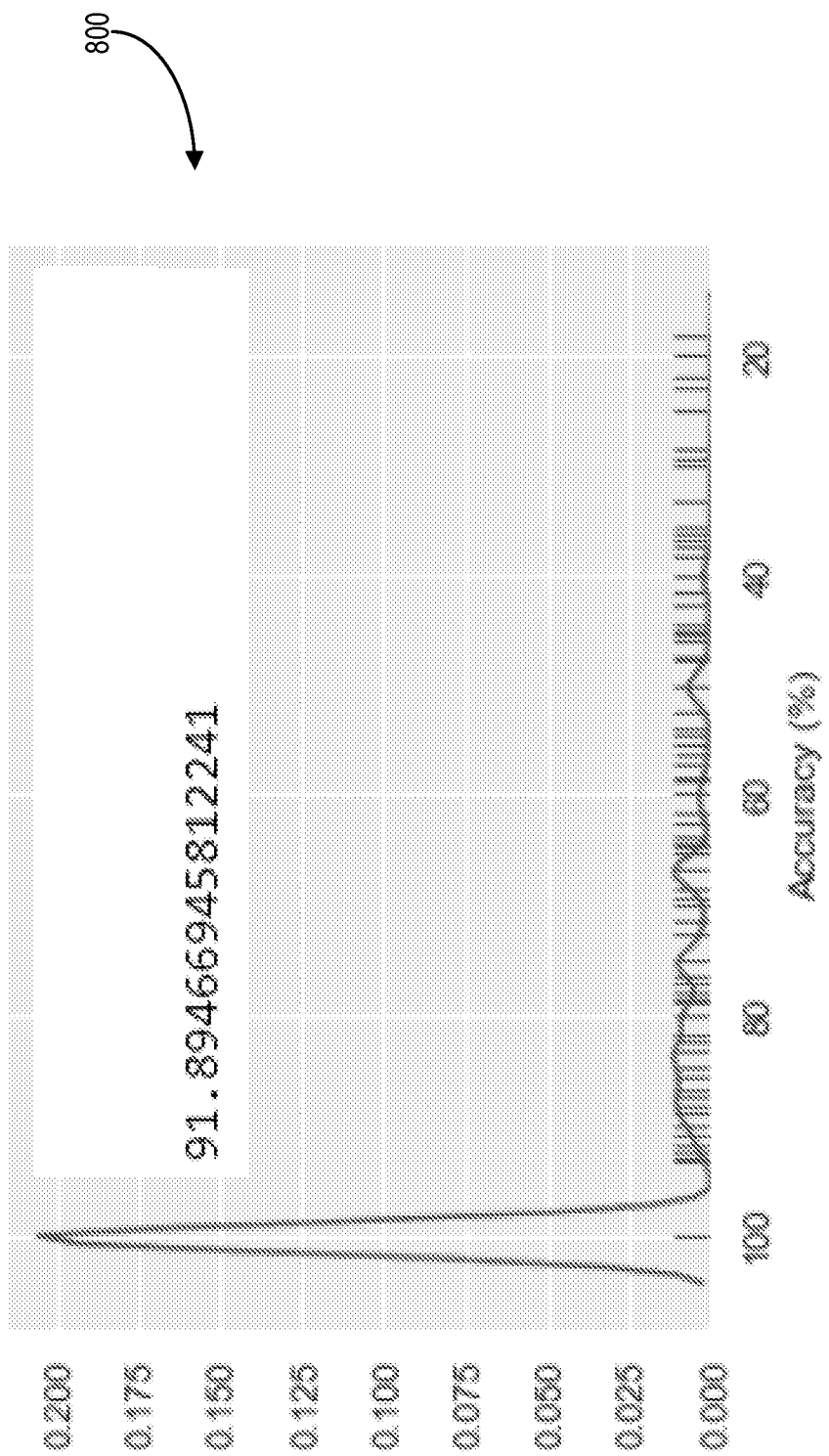
FIGS. 8A-8B respectively illustrate charts reflecting example experimental results of a formation-top modeling system in accordance with one or more embodiments.
Figure 8B:
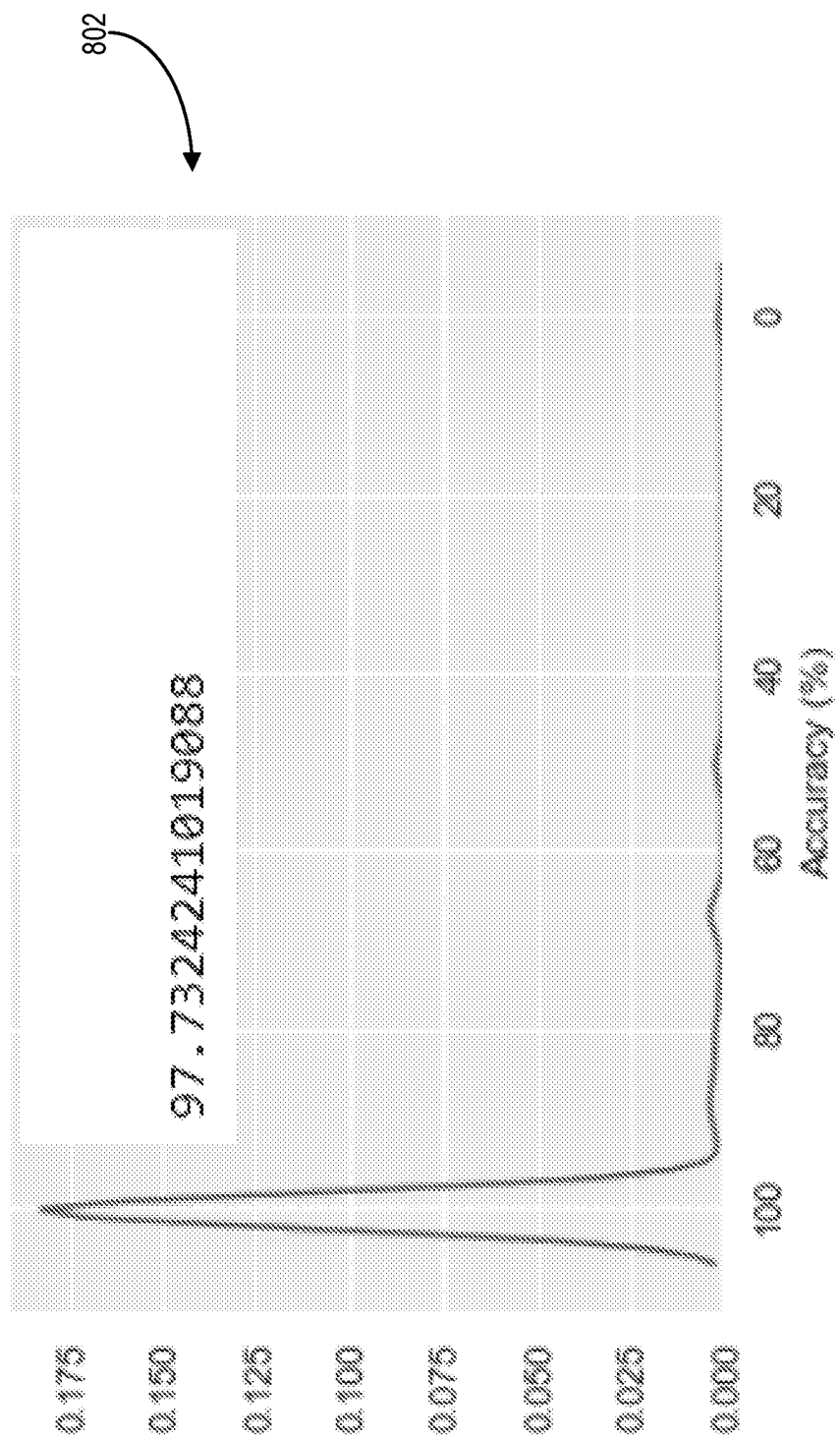

As mentioned above, the formation-top modeling system 104 provides several technical advantages over conventional systems. FIGS. 8A-8B respectively illustrate charts reflecting example experimental results of a formation-top modeling system 104 in accordance with one or more embodiments. In particular, FIG. 8A comprises a chart 800 indicating that the formation-top modeling system 104 can identify formations at a subject drill-well site with an approximate 92% accuracy. These experimental results shown in the chart 800 are validated by (i) effectively hiding observed drill-well data for an observed drill-well in a threshold geographic area, (ii) making a location for the hidden drill-well the subject drill-well site, and (iii) comparing the known formations of the hidden drill-well with the predicted formations generated by the formation-top modeling system 104 as disclosed herein. In so doing, experimental results shown in the chart 800 indicate that the formation-top modeling system 104 can indeed identify the formations at the subject drill-well site as disclosed herein with 92% accuracy.

Likewise, FIG. 8B comprises a chart 802 indicating that the formation-top modeling system 104 can identify an order of formations at a subject drill-well site with an approximate 98% accuracy. These experimental results shown in the chart 802 are validated in a same or similar manner as just described in relation to the experimental results reflected in the chart 800 of FIG. 8A. Additionally, albeit not illustrated in another figure, experimental results indicate that the formation-top modeling system 104 can also identify formation-top depths with an approximate 79% accuracy. These experimental results as just described are validated in the same or similar manner described above (e.g., by comparing predicted formation-top depths as disclosed herein with the observed (hidden) drill-well data).

Figure 9:
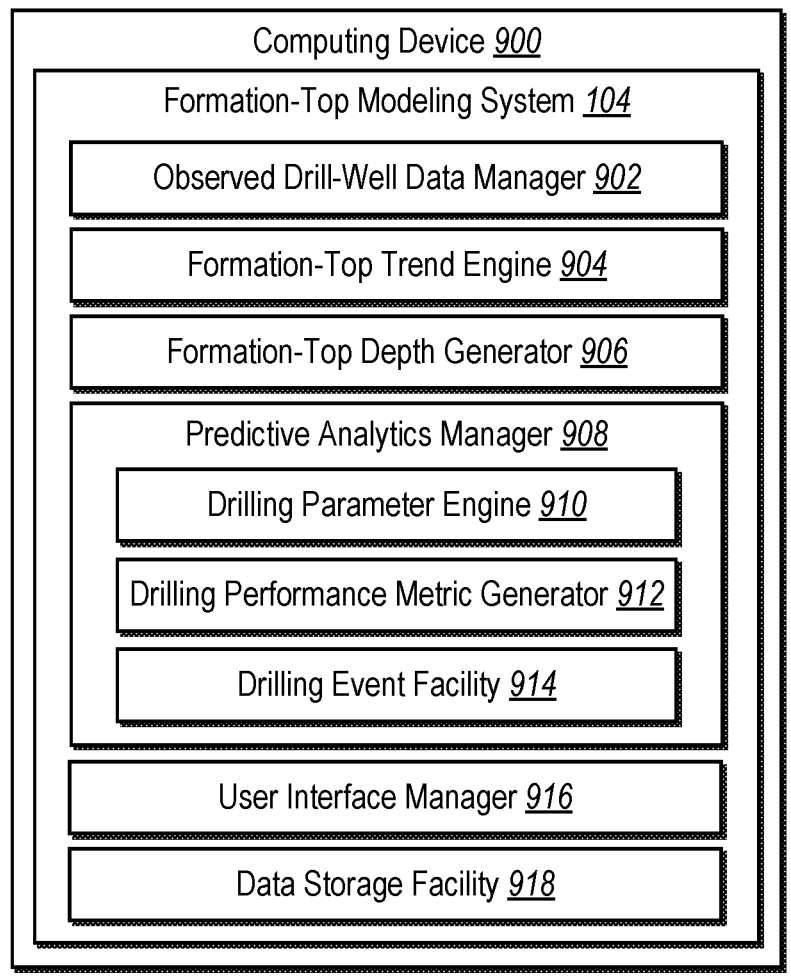
FIG. 9 illustrates an example schematic diagram of a formation-top modeling system in accordance with one or more embodiments.

Turning to FIG. 9, additional detail will now be provided regarding various components and capabilities of the formation-top modeling system 104. In particular, FIG. 9 illustrates an example schematic diagram of the formation-top modeling system 104 implemented by a computing device 900 in accordance with one or more embodiments of the present disclosure. As also illustrated, the formation-top modeling system 104 can include an observed drill-well data manager 902, a formation-top trend engine 904, a formation-top depth generator 906, a predictive analytics manager 908, a user interface manager 916, and a data storage facility 918.

The observed drill-well data manager 902 can request, extract, transmit, store, and/or receive drill-well data corresponding to drill-wells in a geographic area. In particular, the observed drill-well data manager 902 can identify drill-well data for a plurality of drill-wells positioned within a threshold geographic area relative to the location of a subject drill-well site. For example, the observed drill-well data manager 902 can, as disclosed in relation to the foregoing figures, determine and/or receive a location corresponding to the subject drill-well site, and in turn, identify a threshold geographic area that comprises a threshold number of drill-wells (e.g., such that the formation-top trend engine 904 can accurately generate formation-top trends).

The formation-top trend engine 904, can generate formation-top trends as described in relation to the foregoing figures. In particular, the formation-top trend engine 904 can estimate a variogram and map a response. For example, the formation-top trend engine 904 can select a variogram model, generate spatial position data, variogram values, covariance values, and Kriging weights to generate a Kriging estimate of a formation-top depth at an unobserved location. The formation-top trend engine 904 can then iterate and map the Kriging estimates as described above in relation to FIGS. 4A-4G.

The formation-top depth generator 906 can determine, from the formation-top trends, formation-top depths for formations corresponding to the location of the subject drill-well site as disclosed in relation to foregoing figures. In some embodiments, the formation-top depth generator 906 can identify depths of the formation-top trends, in particular continuous subterranean surfaces of the formations corresponding to the location of the subject drill-well site.

The predictive analytics manager 908 comprises a drilling parameter engine 910, a drilling performance metric generator 912, and a drilling event facility 914. With respect to the drilling parameter engine 910, the drilling parameter engine 910 can determine, generate, modify, and/or optimize drilling parameters as disclosed in relation to the foregoing figures. In particular, the drilling parameter engine 910 can utilize observed relationships between drilling parameters and drilling events, drilling performance metrics, etc. to provide and/or modify the drilling parameters as predicted for the subject drill-well site. Additionally, in some implementations, the drilling parameter engine 910 can optimize one or more drilling parameters for drilling through formations at the subject drill-well site as disclosed above.

The drilling performance metric generator 912 can estimate a drilling performance metric for drilling through formations at a subject drill-well site as disclosed in relation to the foregoing figures. In particular, the drilling performance metric generator 912 can compare observed drilling performance metrics for formations by BHA type to visually indicate and/or recommend a BHA for achieving an optimal drilling performance metric in a given formation, drilling section, etc.

Similarly, the drilling event facility 914 can estimate a drilling event for drilling through formations at a subject drill-well site as disclosed in relation to the foregoing figures. In particular, the drilling event facility 914 can compare observed drilling performance metrics for formations by BHA type to visually indicate and/or recommend a BHA for reducing a likelihood of a drilling event in a given formation, drilling section, etc.

The user interface manager 916 can provide, manage, and/or control a graphical user interface (or simply "user interface"). In particular, the user interface manager 916 may generate and display a user interface by way of a display screen composed of a plurality of graphical components, objects, and/or elements that allow a user to perform a function. For example, the user interface manager 916 can receive user inputs from a user, such as a click/tap to provide modify a drilling parameter or initiate a search request for a subject drill-well site. Additionally, the user interface manager 916 can present a variety of types of information, including text, digital media items, formation-top depths, BHA and/or drilling parameter recommendations, or other information.

The data storage facility 918 maintains data for the formation-top modeling system 104. The data storage facility 918 (e.g., via one or more memory devices) can maintain data of any type, size, or kind, as necessary to perform the functions of the formation-top modeling system 104, such as drill-well data for observed drill-wells.

Each of the components of the computing device 900 can include software, hardware, or both. For example, the components of the computing device 900 can include one or more instructions stored on a computer-readable storage medium and executable by processors of one or more computing devices, such as a client device or server device. When executed by the one or more processors, the computer-executable instructions of the formation-top modeling system 104 can cause the computing device(s) (e.g., the computing device 900) to perform the methods described herein. Alternatively, the components of the computing device 900 can include hardware, such as a special-purpose processing device to perform a certain function or group of functions. Alternatively, the components of the computing device 900 can include a combination of computer-executable instructions and hardware.

Furthermore, the components of the computing device 900 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 900 may be implemented as a stand-alone application, such as a desktop or mobile application. Furthermore, the components of the computing device 900 may be implemented as one or more web-based applications hosted on a remote server.

The components of the computing device 900 may also be implemented in a suite of mobile device applications or "apps." To illustrate, the components of the computing device 900 may be implemented in an application, including but not limited to an exploration and production software application like PETREL® or a DELFI® software application, such as, DRILLPLAN®, DRILLOPS®, EXPLOREPLAN™, PRODOPS™, etc. Product names of one or more of the foregoing product names or software suites may include registered trademarks or trademarks of Schlumberger Technology Corporation in the United States and/or other countries.

Figure 10:
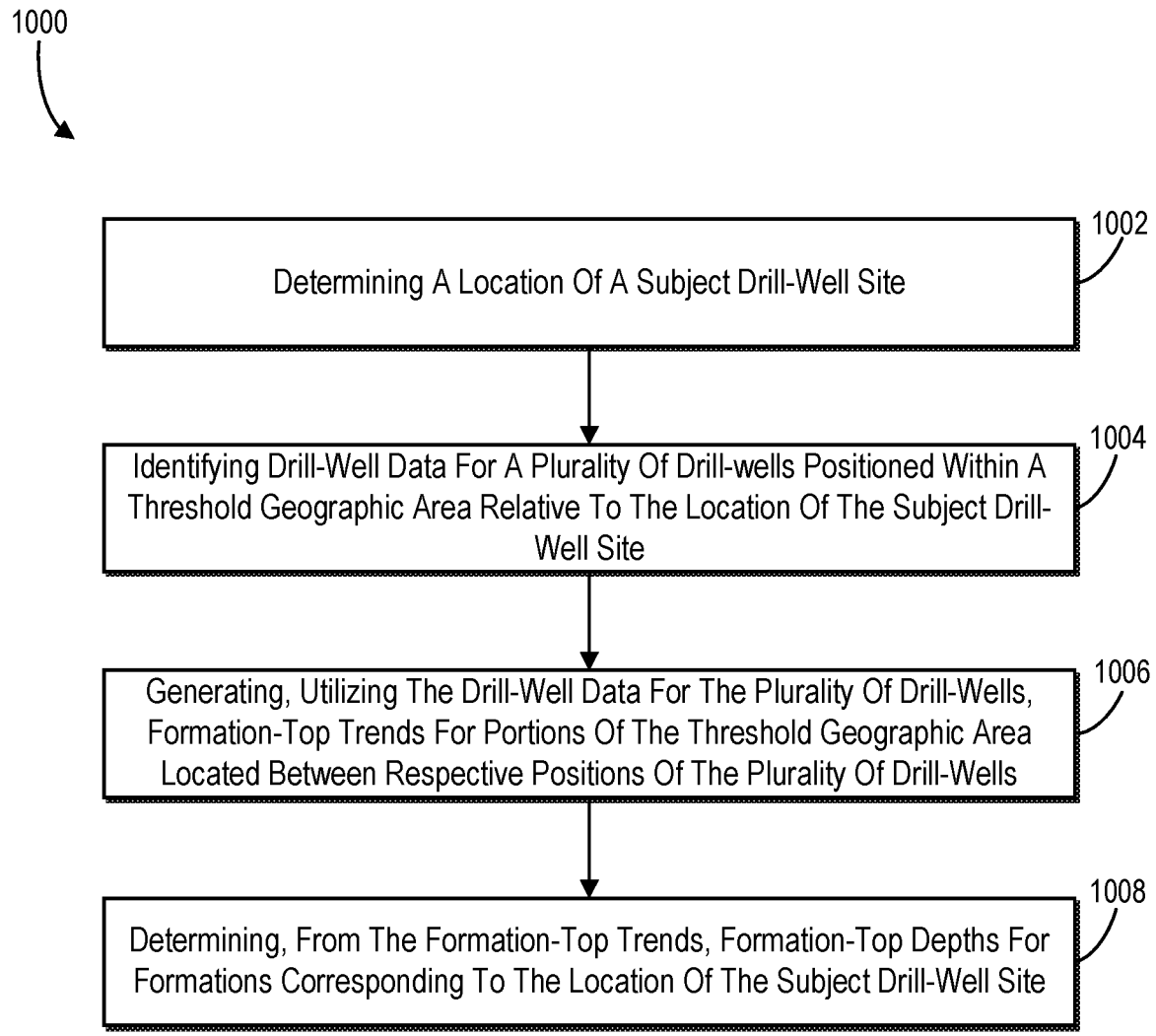
FIG. 10 illustrates a flowchart of a series of acts for determining formation-top depths in accordance with one or more embodiments.

FIGS. 1-9, the corresponding text, and the examples provide several different systems, methods, techniques, components, and/or devices of the formation-top modeling system 104 in accordance with one or more embodiments. In addition to the above description, one or more embodiments can also be described in terms of flowcharts including acts for accomplishing a particular result. For example, FIG. 10 illustrates a flowchart of a series of acts 1000 for determining formation-top depths in accordance with one or more embodiments. The formation-top modeling system 104 may perform one or more acts of the series of acts 1000 in addition to or alternatively to one or more acts described in conjunction with other figures. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown, the series of acts 1000 includes an act 1002 of determining a location of a subject drill-well site. In some embodiments, determining the location of the subject drill-well site comprises receiving, in response to an indication of a user selection from a client device, location coordinates for the subject drill-well site corresponding to the user selection. For example, in some implementations, determining the location coordinates for the subject drill-well site is in response to the indication of the user selection from the client device comprising a location pin-drop via a map interface of the client device.

In addition, the series of acts 1000 further includes an act 1004 of identifying drill-well data for a plurality of drill-wells positioned within a threshold geographic area relative to the location of the subject drill-well site. In some embodiments, identifying the drill-well data for the subset of drill-wells comprises: retrieving, from a field database, the drill-well data for the set of drill-wells; and selecting the drill-well data for the subset of drill-wells based on the respective positions for the subset of drill-wells being associated with location coordinates within the threshold geographic area. Additionally or alternatively, identifying the drill-well data for the subset of drill-wells comprises determining the threshold geographic area in which a threshold number of drill-wells are positioned.

The series of acts 1000 further includes an act 1006 of generating, utilizing the drill-well data for the plurality of drill-wells, formation-top trends for portions of the threshold geographic area located between respective positions of the plurality of drill-wells. In these or other embodiments, generating the formation-top trends comprises identifying a first set of formation-top-depth covariances between the respective positions of the plurality of drill-wells; identifying a second set of formation-top-depth covariances between the location of the subject drill-well site and the respective positions of the plurality of drill-wells; and generating respective Kriging weights for applying to the formation-top depths corresponding to the plurality of drill-wells based on the first set of formation-top-depth covariances and the second set of formation-top-depth covariances. Additionally or alternatively, generating the formation-top trends for portions of the threshold geographic area comprises mapping continuous subterranean surfaces of formations between the respective positions of the plurality of drill-wells by utilizing the respective Kriging weights applied to the formation-top depths corresponding to the plurality of drill-wells.

In some embodiments, act 1006 comprises generating, utilizing the drill-well data for the subset of drill-wells, formation-top trends for portions of the threshold geographic area located between respective positions of the subset of drill-wells by: determining a spatial dependence for formation-top depths between the respective positions of the subset of drill-wells; and identifying, from the spatial dependence for formation-top depths, weighted combinations of the formation-top depths at the respective positions of the subset of drill-wells. In these or other embodiments, determining the spatial dependence for the formation-top depths between the respective positions of the subset of drill-wells comprises estimating a variogram; and identifying the weighted combinations of the formation-top depths at the respective positions of the subset of drill-wells comprises generating Kriging weights for applying to the formation-top depths at the respective positions of the subset of drill-wells. In some implementations, generating the formation-top trends for the portions of the threshold geographic area located between the respective positions of the subset of drill-wells comprises mapping continuous subterranean surfaces of the formations between the respective positions of the subset of drill-wells in accordance with the weighted combinations of the formation-top depths at the respective positions of the subset of drill-wells.

The series of acts 1000 further includes an act 1008 of determining, from the formation-top trends, formation-top depths for formations corresponding to the location of the subject drill-well site. In these or other embodiments, determining the formation-top depths for the formations corresponding to the location (e.g., location coordinates) of the subject drill-well site from the formation-top trends comprises identifying depths of the continuous subterranean surfaces of the formations corresponding to the location (e.g., location coordinates) of the subject drill-well site.

It is understood that the outlined acts in the series of acts 1000 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 10, act(s) in the series of acts 1000 may include an act of providing, for display at a user interface of a client device, the formation-top depths for the formations corresponding to the location of the subject drill-well site. As another example of an additional act not shown in FIG. 10, act(s) in the series of acts 1000 may include an act of providing, for display at a user interface of a client device, drilling parameters that in response to user selection generate at least one of a predicted drilling performance metric or a predicted drilling event for drilling through the formations corresponding to the formation-top depths at the location of the subject drill-well site.

In yet another example of an additional act not shown in FIG. 10, act(s) in the series of acts 1000 may include an act of providing, for display at the user interface of the client device, a graphical representation of the drill-well data for the subset of drill-wells comprising a drilling performance metric for a bottom-hole assembly. In a further example of an additional act not shown in FIG. 10, act(s) in the series of acts 1000 may include an act of providing, for display at the user interface of the client device, drilling parameters that in response to user selection generate a predicted drilling performance metric for drilling with the bottom-hole assembly through one or more of the formations corresponding to the formation-top depths at the location coordinates of the subject drill-well site. In still another example of an additional act not shown in FIG. 10, act(s) in the series of acts 1000 may include an act of providing, for display in one or more user interfaces of the client device: a graphical representation of the drill-well data for the subset of drill-wells comprising drilling events for a bottom-hole assembly; and drilling parameters for user selection to generate a predicted drilling event for drilling with the bottom-hole assembly through one or more of the formations corresponding to the location coordinates of the subject drill-well site.

In some embodiments, an additional act not shown in FIG. 10, act(s) in the series of acts 1000 may include an act of determining an indication of a user selection from a client device corresponds to location coordinates for a subject drill-well site; identifying, from the drill-well data for the set of drill-wells, drill-well data for a subset of drill-wells positioned within a threshold geographic area relative to the location coordinates for the subject drill-well site; generating, utilizing the drill-well data for the subset of drill-wells, formation-top trends for portions of the threshold geographic area located between respective positions of the subset of drill-wells by: determining a spatial dependence for formation-top depths between the respective positions of the subset of drill-wells; and identifying, from the spatial dependence for formation-top depths, weighted combinations of the formation-top depths at the respective positions of the subset of drill-wells; determining, from the formation-top trends, formation-top depths for formations corresponding to the location coordinates of the subject drill-well site; and providing, for display at a user interface of the client device, the formation-top depths for the formations corresponding to the location coordinates of the subject drill-well site.

Further, in some embodiments, an additional act not shown in FIG. 10, act(s) in the series of acts 1000 may include an act of determining, in response to an indication of a user selection from a client device, location coordinates corresponding to the user selection for a subject drill-well site; identifying drill-well data for a subset of drill-wells positioned within a threshold geographic area; generating, utilizing the drill-well data for the subset of drill-wells, formation-top trends for portions of the threshold geographic area located between respective positions of the subset of drill-wells by mapping continuous subterranean surfaces of formations between the respective positions of the subset of drill-wells; and determining, from the formation-top trends, formation-top depths for formations corresponding to the location coordinates of the subject drill-well site by identifying depths of the continuous subterranean surfaces of the formations at the location coordinates of the subject drill-well site.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
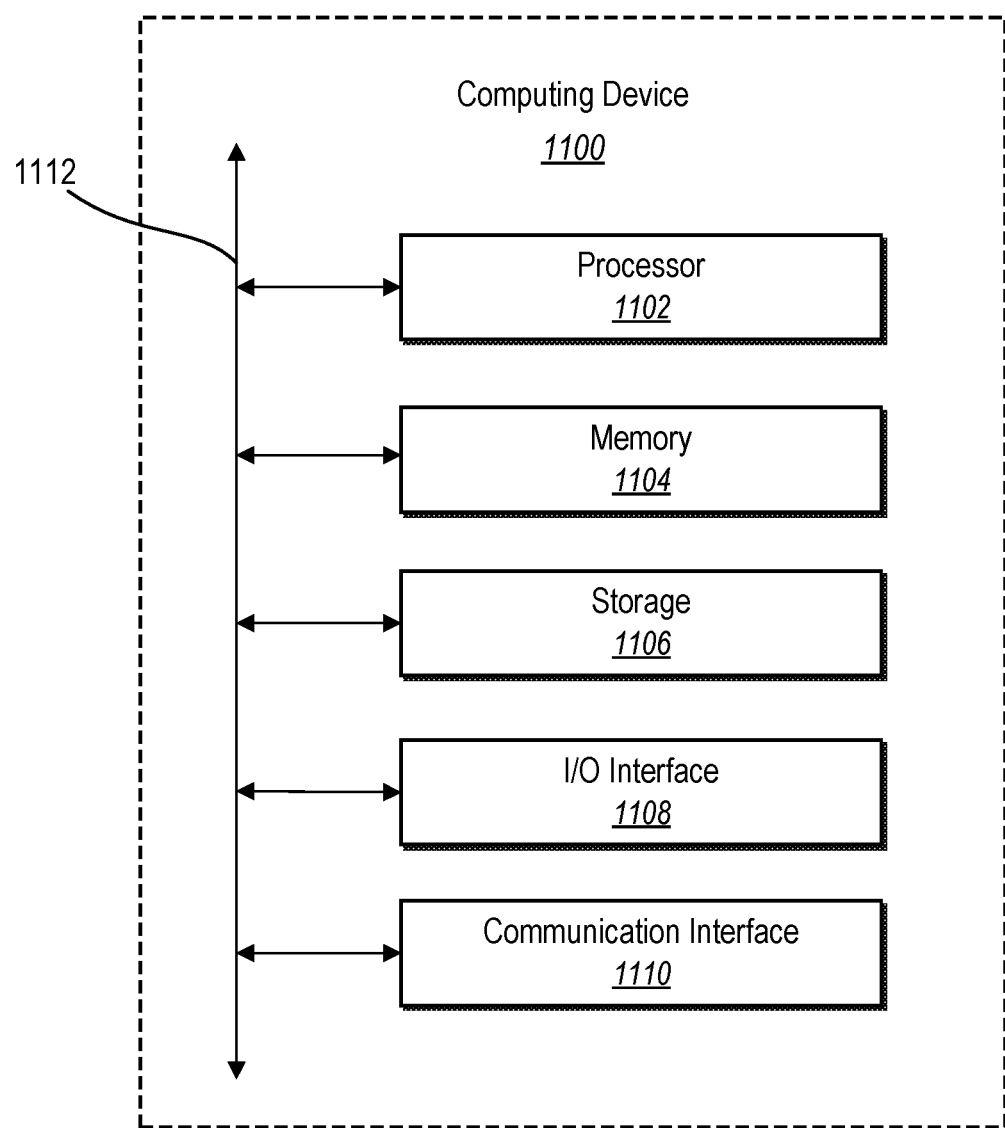
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device 900, the server(s) 102, the third-party server 106, or the client device 108). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining a location of a subject drill-well site;
   identifying drill-well data for a plurality of drill-wells positioned within a threshold geographic area relative to the location of the subject drill-well site;
   generating, utilizing the drill-well data for the plurality of drill-wells, formation-top trends for portions of the threshold geographic area located between respective positions of the plurality of drill-wells, wherein the generating the formation-top trends comprises:
   identifying a first set of formation-top-depth covariances between the respective positions of the plurality of drill-wells;
   identifying a second set of formation-top-depth covariances between the location of the subject drill-well site and the respective positions of the plurality of drill-wells; and
   generating respective Kriging weights for applying to formation-top depths corresponding to the plurality of drill-wells based on the first set of formation-top-depth covariances and the second set of formation-top-depth covariances; and determining, from the formation-top trends, the formation-top depths for formations corresponding to the location of the subject drill-well site.

2. The computer-implemented method of claim 1, further comprising providing, for display at a user interface of a client device, the formation-top depths for the formations corresponding to the location of the subject drill-well site.

3. The computer-implemented method of claim 1, further comprising providing, for display at a user interface of a client device, drilling parameters that in response to user selection generate at least one of a predicted drilling performance metric or a predicted drilling event for drilling through the formations corresponding to the formation-top depths at the location of the subject drill-well site.

4. The computer-implemented method of claim 1, wherein generating the formation-top trends for the portions of the threshold geographic area comprises mapping continuous subterranean surfaces of the formations between the respective positions of the plurality of drill-wells by utilizing the respective Kriging weights applied to the formation-top depths corresponding to the plurality of drill-wells.

5. The computer-implemented method of claim 4, wherein determining the formation-top depths for the formations corresponding to the location of the subject drill-well site from the formation-top trends comprises identifying depths of the continuous subterranean surfaces of the formations corresponding to the location of the subject drill-well site.

6. The computer-implemented method of claim 1, wherein determining the location of the subject drill-well site comprises receiving, in response to an indication of a user selection from a client device, location coordinates for the subject drill-well site corresponding to the user selection.

7. A system comprising:
one or more memory devices comprising drill-well data for a set of drill-wells; and
one or more server devices configured to cause the system to:
determine an indication of a user selection from a client device corresponding to location coordinates for a subject drill-well site;
identify, from the drill-well data for the set of drill-wells, the drill-well data for a subset of drill-wells positioned within a threshold geographic area relative to the location coordinates for the subject drill-well site;
generate, utilizing the drill-well data for the subset of drill-wells, formation-top trends for portions of the threshold geographic area located between respective positions of the subset of drill-wells by:
identifying a first set of formation-top-depth covariances between the respective positions of the subset of drill-wells;
identifying a second set of formation-top-depth covariances between the location coordinates for the subject drill-well site and the respective positions of the subset of drill-wells; and
generating respective Kriging weights for applying to formation-top depths corresponding to the subset of drill-wells based on the first set of formation-top-depth covariances and the second set of formation-top-depth covariances;
determine, from the formation-top trends, the formation-top depths for formations corresponding to the location coordinates for the subject drill-well site; and
provide, for display at a user interface of the client device, the formation-top depths for the formations corresponding to the location coordinates for the subject drill-well site.

8. The system of claim 7, wherein the one or more server devices are configured to cause the system to provide, for display at the user interface of the client device, a graphical representation of the drill-well data for the subset of drill-wells comprising a drilling performance metric for a bottom-hole assembly.

9. The system of claim 8, wherein the one or more server devices are configured to cause the system to provide, for display at the user interface of the client device, drilling parameters that in response to the user selection generate a predicted drilling performance metric for drilling with the bottom-hole assembly through one or more of the formations corresponding to the formation-top depths at the location coordinates for the subject drill-well site.

10. The system of claim 7, wherein the one or more server devices are configured to cause the system to:
determine a spatial dependence for the formation-top depths between the respective positions of the subset of drill-wells by estimating a variogram; and
identify weighted combinations of the formation-top depths at the respective positions of the subset of drill-wells by generating the respective Kriging weights for applying to the formation-top depths at the respective positions of the subset of drill-wells.

11. The system of claim 10, wherein the one or more server devices are configured to generate the formation-top trends for the portions of the threshold geographic area located between the respective positions of the subset of drill-wells by mapping continuous subterranean surfaces of the formations between the respective positions of the subset of drill-wells in accordance with the weighted combinations of the formation-top depths at the respective positions of the subset of drill-wells.

12. The system of claim 11, wherein the one or more server devices are configured to determine the formation-top depths for the formations corresponding for the subject drill-well site by identifying depths of the continuous subterranean surfaces of the formations at the location coordinates for the subject drill-well site.

13. The system of claim 7, wherein the one or more server devices are configured to cause the system to identify the drill-well data for the subset of drill-wells by:
retrieving, from a field database, the drill-well data for the set of drill-wells; and
well data for the subset of drill-wells based on the respective positions of the subset of drill-wells being associated with the location coordinates within the threshold geographic area.

14. The system of claim 7, wherein the one or more server devices are configured to cause the system to identify the drill-well data for the subset of drill-wells by determining the threshold geographic area in which a threshold number of drill-wells are positioned.

15. A non-transitory computer-readable medium storing instructions that, when executed by at least one processor, cause a computing device to:
determine, in response to an indication of a user selection from a client device, location coordinates corresponding to the user selection for a subject drill-well site;
identify drill-well data for a subset of drill-wells positioned within a threshold geographic area;
generate, utilizing the drill-well data for the subset of drill-wells, formation-top trends for portions of the threshold geographic area located between respective positions of the subset of drill-wells by:
  identifying a first set of formation-top-depth covariances between the respective positions of the subset of drill-wells;
  identifying a second set of formation-top-depth covariances between the location coordinates for the subject drill-well site and the respective positions of the subset of drill-wells; and
  generating respective Kriging weights for applying to formation-top depths corresponding to the subset of drill-wells based on the first set of formation-top-depth covariances and the second set of formation-top-depth covariances; and
determine, from the formation-top trends, the formation-top depths for formations corresponding to the location coordinates for the subject drill-well site.

16. The non-transitory computer-readable medium of claim 15, further comprising instructions that, when executed by the at least one processor, cause the computing device to provide, for display at a user interface of the client device, the formation-top depths for the formations corresponding to the location coordinates for the subject drill-well site.

17. The non-transitory computer-readable medium of claim 15, further comprising instructions that, when executed by the at least one processor, cause the computing device to provide, for display in one or more user interfaces of the client device:
  a graphical representation of the drill-well data for the subset of drill-wells comprising drilling events for a bottom-hole assembly;
  and drilling parameters for the user selection to generate a predicted drilling event for drilling with the bottom-hole assembly through one or more of the formations corresponding to the location coordinates for the subject drill-well site.

18. The non-transitory computer-readable medium of claim 15, further comprising instructions that, when executed by the at least one processor, cause the computing device to determine the location coordinates for the subject drill-well site in response to the indication of the user selection from the client device comprising a location pin-drop via a map interface of the client device.

19. The non-transitory computer-readable medium of claim 15, further comprising instructions that, when executed by the at least one processor, cause the computing device to provide, for display at a user interface of the client device, a group of threshold geographic areas available for selection that comprise a threshold number of drill-wells.

20. The non-transitory computer-readable medium of claim 15, wherein generating the formation-top trends for the portions of the threshold geographic area comprises mapping continuous subterranean surfaces of the formations between the respective positions of the subset of drill-wells by utilizing the respective Kriging weights applied to the formation-top depths corresponding to the subset of drill-wells.

* * * * *